(12) United States Patent
Hall et al.

(10) Patent No.: US 10,142,165 B2
(45) Date of Patent: Nov. 27, 2018

(54) ADAPTIVE COMMUNICATION CHANNEL REDUNDANCY IN A HUB-BASED INTERMEDIATE-RANGE SYSTEM

(71) Applicants: David R. Hall, Provo, UT (US); Craig Boswell, Draper, UT (US); Everett D. Robinson, Pleasant Grove, UT (US); Joe Fox, Spanish Fork, UT (US)

(72) Inventors: David R. Hall, Provo, UT (US); Craig Boswell, Draper, UT (US); Everett D. Robinson, Pleasant Grove, UT (US); Joe Fox, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 32 days.

(21) Appl. No.: 15/495,025

(22) Filed: Apr. 24, 2017

(65) Prior Publication Data

US 2018/0309619 A1   Oct. 25, 2018

(51) Int. Cl.
| | |
|---|---|
| *H04L 12/24* | (2006.01) |
| *H04L 5/00* | (2006.01) |
| *H04L 12/12* | (2006.01) |
| *H04W 24/04* | (2009.01) |
| *H04W 72/08* | (2009.01) |
| *H04W 72/04* | (2009.01) |

(Continued)

(52) U.S. Cl.
CPC .......... *H04L 41/0668* (2013.01); *H01Q 1/38* (2013.01); *H01Q 9/0407* (2013.01); *H04B 1/7097* (2013.01); *H04L 5/0055* (2013.01); *H04L 12/12* (2013.01); *H04L 67/125* (2013.01); *H04W 24/04* (2013.01); *H04W 52/0238* (2013.01); *H04W 72/0453* (2013.01); *H04W 72/085* (2013.01); *H04B 2201/709709* (2013.01)

(58) Field of Classification Search
CPC ... H04L 41/0668; H04L 5/0055; H04L 12/12; H04L 67/125; H01Q 1/38; H01Q 9/0407; H04B 1/7097; H04B 2201/709709; H04W 24/04; H04W 52/0238; H04W 72/0453; H04W 72/085
See application file for complete search history.

(56) References Cited

U.S. PATENT DOCUMENTS

| | | | |
|---|---|---|---|
| 9,911,290 B1 * | 3/2018 | Zalewski | G07G 1/0072 |
| 2018/0205631 A1 * | 7/2018 | Chow | H04L 43/50 |

(Continued)

*Primary Examiner* — Jae Y Lee

(57) ABSTRACT

Disclosed herein are hub-based wireless networks employing end-devices at intermediate wireless at ranges of thousands of meters. End-devices may be such things as keypads, door latches, occupancy monitors, sprinkler controllers and other devices controlled or monitored in a campus or a collection of buildings. A device-initiated asynchronous mode may be used to communicate information related to spontaneous events to a hub. The hub receives packet retrial information from the end-devices, determines whether packet retrials are due to interference or some other cause such as collisions, and applies varying levels of redundancy based upon a recent history of success and failure of packet exchanges, which measurement may be a value of badness increased as errors are encountered and decreased as packet communication is successful. Detailed information on various example embodiments of the inventions are provided in the Detailed Description below, and the inventions are defined by the appended claims.

20 Claims, 10 Drawing Sheets

(51) Int. Cl.
  *H04L 29/08*    (2006.01)
  *H01Q 9/04*    (2006.01)
  *H01Q 1/38*    (2006.01)
  *H04B 1/7097*    (2011.01)
  *H04W 52/02*    (2009.01)

(56) References Cited

U.S. PATENT DOCUMENTS

2018/0206135 A1\* 7/2018 Chow .................. H04W 24/08
2018/0206136 A1\* 7/2018 Chow .................. H04W 24/08

\* cited by examiner

FIG. 1
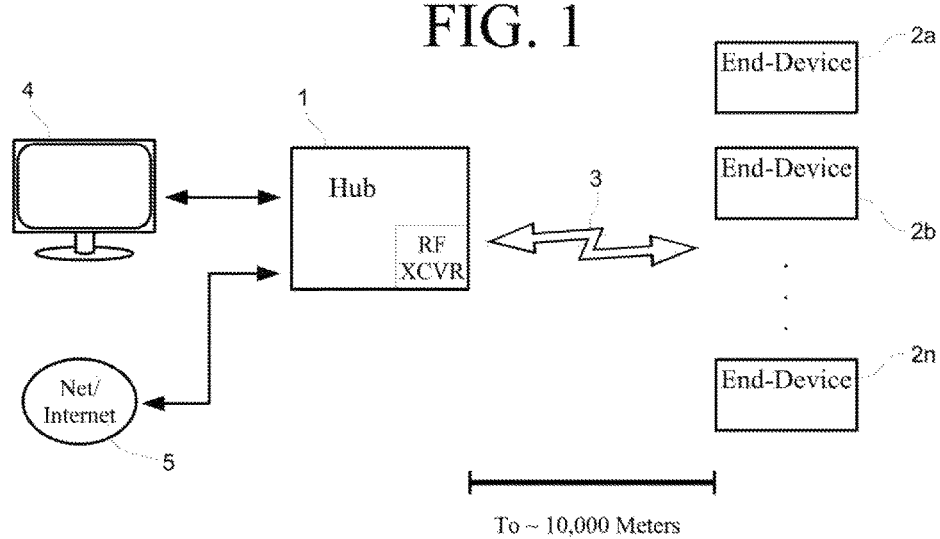
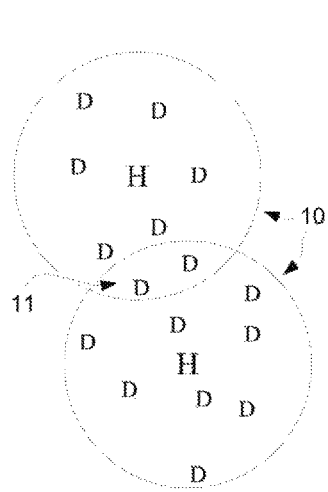
FIG. 2
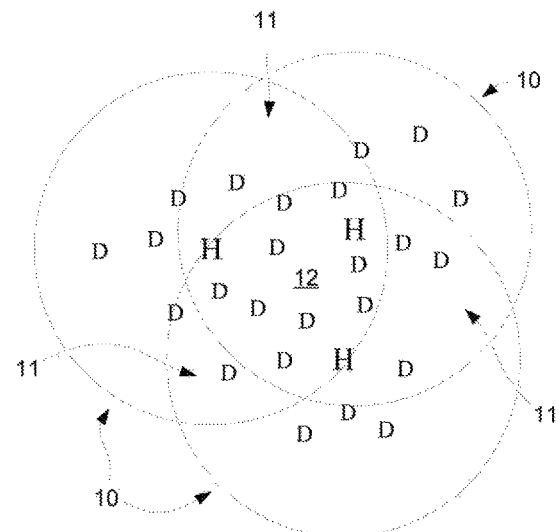
FIG. 3

FIG. 4
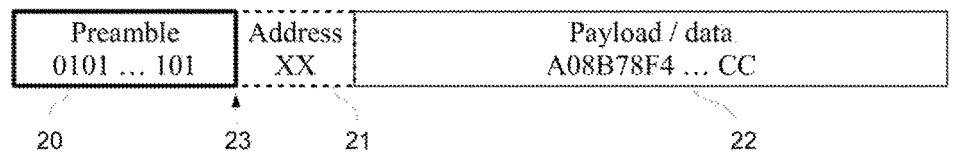
FIG. 5
FIG. 7
FIG. 6
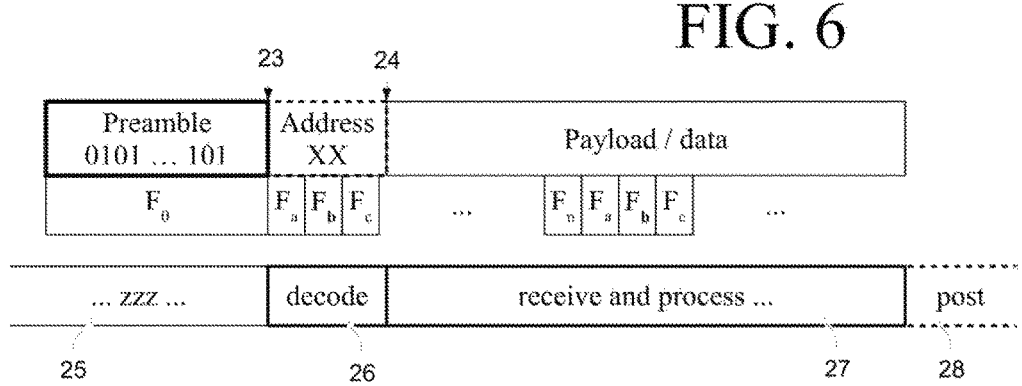

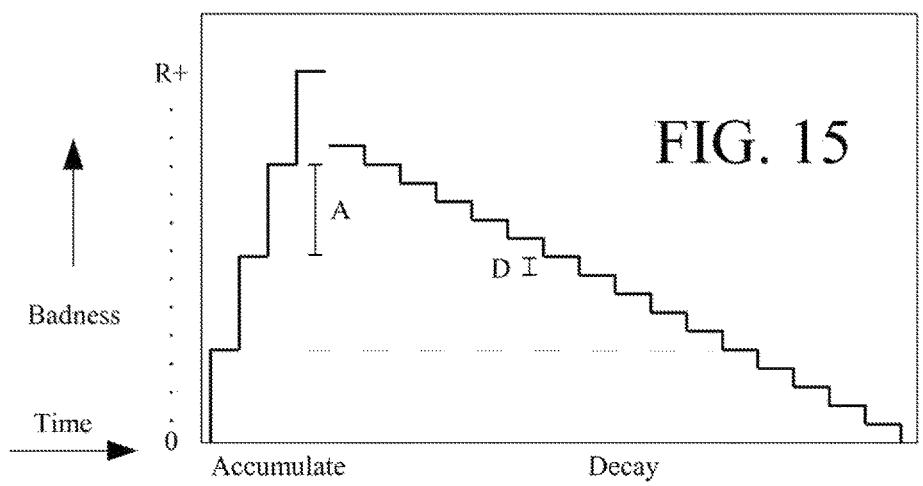
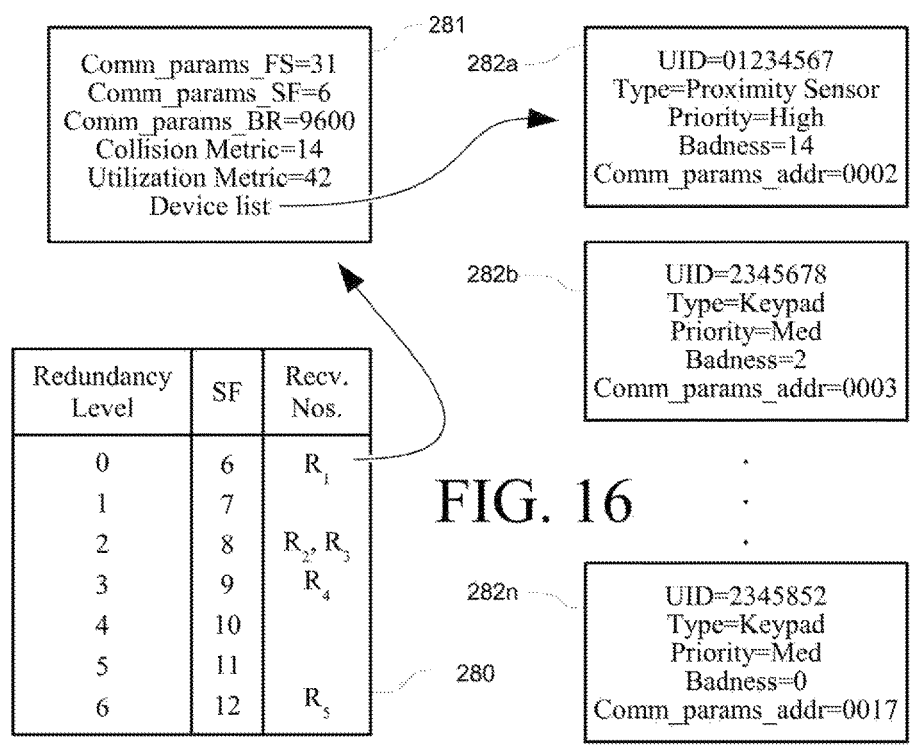

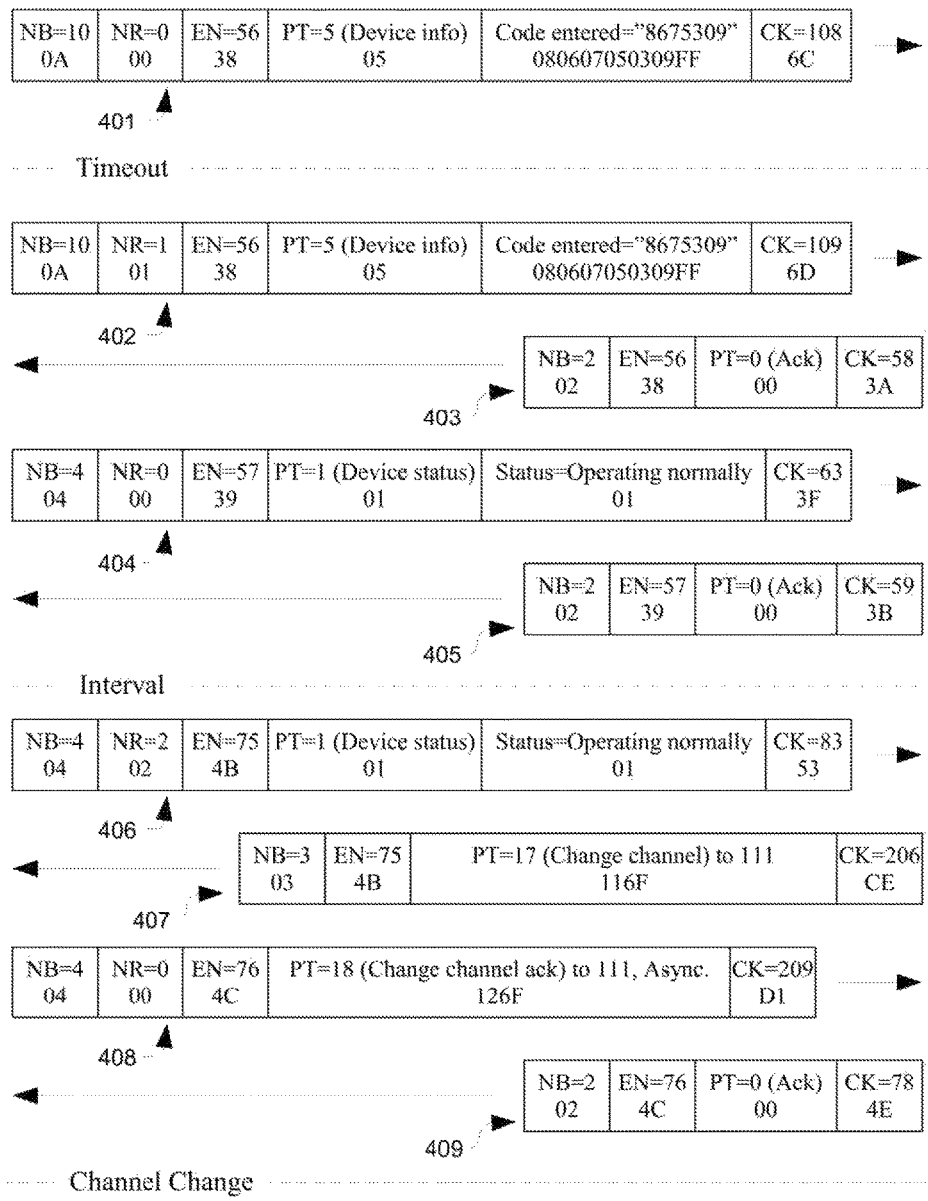

ADAPTIVE COMMUNICATION CHANNEL REDUNDANCY IN A HUB-BASED INTERMEDIATE-RANGE SYSTEM

BACKGROUND

In recent history, relatively inexpensive electronic devices have become available to ordinary property-owners that wish to monitor and control various aspects of their properties. A recent concept called the "Internet of Things" imagines home-related electronic devices that can be reached through the Internet, by which an environment can be controlled, e.g., lighting, temperature, digital video recorders, and many other "smart" devices. That kind of device ordinarily requires a connection to a network switch or hub, which connection can be wired or wireless.

Wireless collections to such smart devices are often desired, particularly in existing constructions, avoiding the laying of wires in existing walls and other structures. Technologies serving this purpose include wattage devices that communicate using the 2.4 GHz 802.11b/g "WiFi" protocol, and other more-recent and similar protocols such as Zigbee and Z-Wave. These protocols generally permit data rates of 100 k bytes per second or more, allowing for devices that transmit and forward audio and video data in substantial real-time. However with high data rates come a vulnerability to interference from other devices operating on the same radio bands, and accordingly devices using these short-range protocols are generally limited to service within a single residence or building within a distance of less than 100 meters.

Recent technologies have been developed that permit operation to an intermediate range, communicating between points that are several miles or more away, for example using the LoRaWAN protocol. In this type of network, interference reduction is achieved by using frequencies in the UHF band and by including redundancies in communication, using for example multiple sampling, multiple frequency (spread-spectrum) techniques, and/or error-tolerant protocols. The use of the UHF band avoids interference from over-the-horizon sources, while at the same time avoiding some attenuation-of-signal from water-vapor, precipitation, buildings and other physical obstructions. These redundancies and protocols necessarily reduce the data throughput such that audio and video data cannot be streamed in good quality or in real-time.

An exemplary use of intermediate-range communication is in the recent deployment of wireless utility meters. Having a utility meter that can be read without a person traveling to and visually looking at it is a substantial cost savings for a utility. For such a use a meter communicates two items of information, which are an identifier for the meter and the meter reading itself; the utility takes a pair of such items and generates a bill for a utility subscriber. Because utility bills are ordinarily generated once per month, the amount of data from a single meter is usually on the order of a few tens of bytes in that period. Thus tens or even hundreds of thousands of meters can share a single intermediate-range channel, largely without interference from other devices.

The unsuitability of existing systems at intermediate ranges for large numbers of devices, for example in the Internet-Of-Things, is an unsolved problem. Turning now to FIG. 2, two proximal short-range networks are conceptually shown, such as those constructed from devices communicating through the 802.11 g protocol, for example using the Zigbee specification. In the example two property owners each operate a hub "H" servicing multiple devices "D", and as shown in the figure the circumference of effective communication 10 of each hub is proximal so as to create a zone of interference 11. Communication with the devices in that zone can be affected by communications with a non-subscribing hub, so as to introduce possible packet transmission collisions and interference. However, because these networks are short-range, the zone of interference 11 is relatively small, and the frequency of collisions and interference is likewise negligible. Proximal operators of such networks can experience impacts, but because of the short-range and the short transmission time of packets, these impacts are minor and usually acceptable.

In contrast as shown in FIG. 3, three intermediate-range networks are located in similar proximity, each with a hub "H" and subscribing devices "D". Because of the greater distance of communication provided, most devices "D" are located in zones of interference 11, and many devices may be located in regions 12 where several hubs are located within range. Thus where intermediate-range networks are to be used most communication between hubs and devices and also inter-device communications should be expected to take place under conditions of interference, especially when located within a city or other populated area. Utility meter reading and other existing installations using the LoRa or LoRaWAN protocols manage this congestion by being the only network in the radio locality on a particular frequency, and by infrequent packet transmission on the order of once per week or month such that collisions between devices aren't likely. Utility meters are configured and installed by the utility provider, who can limit the number of end-devices within a locality to ensure network reliability. Because the provider is the only consumer of the applicable bandwidth resources, it can effectively control interference and manage congestion.

Unavailable on the consumer market today are hubs and end-devices that can operate at intermediate ranges. The short-range "WiFi" 802.11 b/g network is now so popular that in most urban areas there is a router within communication range no matter where a person finds himself; most households using the Internet now have one, purchased from a retailer. If the range of those routers and the devices they service were to be extended to an intermediate range, the result would be a collapse of system functionality from overwhelming interference. Thus, in order to bring intermediate-range devices to the ordinary consumer, further development is needed.

The existing intermediate-range techniques, however, aren't conducive for applications where interactivity is need. For a channel sharing thousands of meters, it isn't necessary to resolve collisions between devices in a matter of milliseconds, because data transmissions can be delayed without significant impacts. In another example, an irrigation controller will ordinarily keep a set of sprinklers on for minutes at a time, and a delay of multiple seconds or even minutes is tolerable. In contrast, a person activating a light switch, for example, will not accept activation of lights with perhaps more than a one-second delay. Where a person enters a code on a keypad to enter a building, he expects a controlled lock to deactivate in real-time. In general, the existing intermediate-range technologies are fault-susceptible and not reliable for such interactivity, particularly where multiple devices share a common communications frequency or channel.

Interactivity issues for battery-powered devices can be even worse. For these devices, it is generally undesirable to keep a receiver continuously powered, and worse to repeatedly being awakened from a sleep mode to process and discriminate packets destined for other devices. The LoRaWAN Class A and B protocols address this by having end-devices turn off their receivers for long periods of time, waking up periodically to interact with a network gateway. Such a device may remain asleep for seconds, minutes or even hours, and thus cannot be made responsive to incoming queries. Furthermore, these protocols are susceptible to collisions from co-transmitting devices, which may require backing off interactions with a hub, and no time of reception can be guaranteed. Thus absent from the field of the invention is a system that can provide adequate and reliable service for groups of sensed and controlled remote devices at intermediate ranges.

Disclosed herein are hub-based wireless networks employing end-devices at intermediate wireless at ranges of thousands of meters. End-devices may be such things as keypads, door latches, occupancy monitors, sprinkler controllers and other devices controlled or monitored in a campus or a collection of buildings. A device-initiated asynchronous mode may be used to communicate information related to spontaneous events to a hub. The hub receives packet retrial information from the end-devices, determines whether packet retrials are due to interference or some other cause such as collisions, and applies varying levels of redundancy based upon a recent history of success and failure of packet exchanges, which measurement may be a value of badness increased as errors are encountered and decreased as packet communication is successful. Detailed information on various example embodiments of the inventions are provided in the Detailed Description below, and the inventions are defined by the appended claims.

BRIEF DESCRIPTION OF THE DRAWINGS

FIG. 1 depicts a network topology utilizing multiple end-devices and an interactive hub.

FIG. 2 depicts potential interference in two proximal short-range wireless networks.

FIG. 3 depicts potential interference in three proximal intermediate-range wireless networks.

FIG. 4 shows an exemplary wireless data packet structure that includes a preamble and a variable payload.

FIG. 5 illustrates an exemplary frequency-sequence table using in digital spread-spectrum communications between a hub and an end-device.

FIG. 6 depicts typical power states of an end-device through the coarse of reception of one kind of intermediate-range wireless packet.

FIG. 7 shows an exemplary set of discrete and orthogonal wireless channels for communication between a hub and a set of end-devices.

FIG. 15 illustrates the behavior of a badness value in the presence of extreme interference and clearance as determined by several settings.

FIG. 16 depicts a memory structure retaining communications parameters, qualitative channel information, receiver-specific and device-specific information for communication with individual end-devices operating in asynchronous mode.

FIG. 17 depicts a packet sequence using an exemplary asynchronous protocol between a hub and an end-device including retrial information and channel-changing commands.

DETAILED DESCRIPTION

Figure 8:
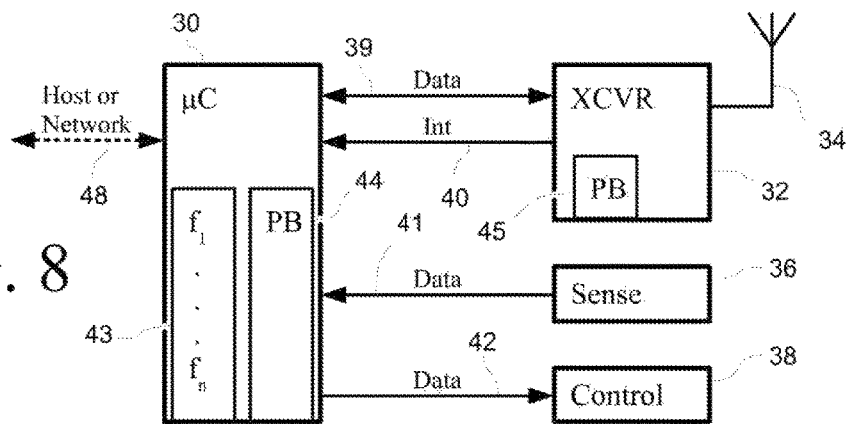
FIG. 8 shows an exemplary circuit architecture suitable for an ordinary end-device.

Shown in FIG. 1 is an exemplary intermediate system employing a hub-type topology. A hub 1 is placed within wireless range of end-devices 2*a-n*, communicating 3 over the airwaves at a distance of up to 10 km or more, depending upon environmental conditions. In many cases, end-devices 2 are electronic devices that accept commands and transmit information to a controlling hub 1. Included in hub 1 and each of end-devices 2*a-n* is a processor, software for performing the functions of the device, and an RF transceiver. Hub 1 could be an ordinary personal computer with an RF adapter or card installed, or it might simply look like a box with an antenna and a port or interface permitting configuring and monitoring; it is foreseen that a manufacturer would likely supply a hub 1 in a ready-to-use state such that an installer need not open its case or install any software. The hub and or the end-devices as disclosed herein may comprise one or more antennas each comprising a printed circuit board having a planar side comprising a plurality of electrically conductive planar v-shaped antenna segments, each v-shaped antenna segment comprising an open end formed by non-equidistant, non-parallel sides and a closed end formed by an intersection of the non-equidistant, non-parallel sides. In one configuration, hub 1 is connectable to a personal computer 4, for example through a USB interface, computer 4 having installed thereon software functional to configure and monitor the hub 1. In another configuration, hub 1 has a network port whereby communications may be had with network 5. These communications may be through any conceivable type or protocol. In one example a hub 1 sends messages through a TCP/IP sockets-based protocol to a proprietary server existing on the network 5. In another example, hub 1 has software that permits it to be seen as an HTTP server from any device on network 5. Thus in some installations, hub 1 may be connected directly to and accessible from the Internet, allowing for access from any Internet-connected device. The antenna of hub 1 will typically be elevated and located in an obstruction-fee locality to maximize signal-strength with end-devices 2.

End-devices 2 are preferably manufactured in an unconfigured state, ready for pairing with a hub 1, each device having a unique identity (UID) to discriminate it from others. Such end-devices 2 can be of varying types, providing man kinds of control and sensing functions. In one example, an end-device has an infra-red motion sensor built in, includes programming to record the time of the last motion event, and may also include programming to initiate a notification packet to a hub 1 upon a motion sensing event. In another example, an end-device includes a keypad whereby a person can enter a code, upon which a message is sent to hub 1 containing a sequence of keypresses. Such an end-device may be paired with another device which activates and deactivates a door latch, by way of messaging from hub 1, and the hub contains programming and configuration to read the keypad end-device and control the latch end-device as correct codes are entered. In a further example, several end-devices 2 are located throughout a building, sensing the temperature at various locations. Another end-device 2 controls a central-air system, providing heating and cooling to the building at the direction hub 1 without human intervention based upon thermostat data forwarded through hub 1. The kinds of end-devices 2 that can be employed are virtually limitless, so long as they are electronic and provide either a control or a sensing function while staying within the available data throughput limitations.

Intermediate-Range Packets and Transferrence Basics

Described herein are electronic devices that are functional at intermediate ranges even in populated or congested areas, providing for simple installation by an ordinary home- or business-owner; as will presently be described and shown. These devices can be made reliable enough to use in failure-intolerant situations, such as security systems, even where an RF spectrum is congested. Remote devices can be made to operate on battery power, use low-power transmitters, and in many cases made to operate through the sending of a single bit per packet. Equipment can be made to fit in a hand-held enclosure, e.g., with a small omnidirectional antenna operating in the UHF frequency band. It is sometimes the case that a low-data rate network device will be desired to be placed in a location where power is available, but where neither network cabling nor a WiFi network is available. This kind of application is particularly suitable for intermediate range equipment. One kind of intermediate-range technology is known as "LoRa", descriptions of which are publicly available from the LoRa Alliance of San Ramon, Calif., which maintains a website at www.lora-alliance.org. The hub and or the end-devices as disclosed herein may comprise one or more antennas each comprising a printed circuit board having a planar side comprising a plurality of electrically conductive planar v-shaped antenna segments, each v-shaped antenna segment comprising an open end formed by non-equidistant, non-parallel sides and a closed end formed by an intersection of the non-equidistant, non-parallel sides.

Shown in FIG. 4 is the structure of a simple data packet which may be used in communication between a hub and an end-device, a sub-type of which is used in the LoRa protocol. The structure has three parts, which are a preamble 20, a data payload 22, and an optional address 21. Payload 22 is generic and can contain many kinds of data as desired, depending upon the functions provided by an end-device. Payload 22 will often contain a command or a response, for example a command to open a latch or a response that a power switch is presently in an "on" state. Address 21 discriminates between devices operating on the same communications channel, and may not be needed where a single hub and end-device pair are the sole devices operating on that channel. (A description of what defines a channel appears below.) Preamble 20 is present to provide synchronization for a radio-frequency receiver, at a hub or an end-device, at a programmed frequency such that the receiving device can decode the contents of the packet. A preamble is preferably a fixed, identifiable and unnatural pattern that can be recognized by a simple state machine without starting a general-purpose processor. The packet structure of FIG. 4 can be transmit using many modulation techniques; LoRa devices use frequency shift keying for interference immunity, although other modulations can be used in accordance with the dictates of a particular operating environment.

Packets can be transmit over a single carrier frequency, if desired, but because of benefits including resistance to noise and reduced impacts on particular parts of a frequency spectrum, spread-spectrum modulation has become popular. In this modulation technique, a sequence of frequencies is provided at a transmitter and a receiver; although in traditional encrypting systems the sequence might be generated by a pseudo-random generator with a secret seed and function parameters (which still can be used), for noise resistance and spreading of Tx power all that is needed is as sequence of frequencies uniformly spread over a given available set. This can be accomplished by the inclusion of a table as shown in FIG. 5, containing a sequence of n frequencies. In the example, each frequency $F_x$ is indexed by a sequence number $I_D$, such that the current operational frequency can be determined as a function of time from a point of synchronization, for example the end 23 of the preamble of a packet as in FIG. 4. The arrangement of frequencies in a sequence may be incremental, random, or in any order desired, keeping mind that use of each frequency an equal number of times will result in the desired uniformity.

The transmission of a packet using this modulation technique is as shown in FIG. 6, beginning with the preamble at a known initial frequency $F_0$. The preamble is preferably not just a square wave, but a pattern whereby synchronization point 23 can be positively determined. The transmitter then sequences through the frequencies at a known period, mirrored by the receiver. For noise and interference immunity the sequence period is preferably much shorter than the time needed for each bit or symbol, but longer periods can be used to achieve a spreading of power across a spectrum. The sequence period should preferably be much shorter than the time of preamble transmission, such that preambles are easy to distinguish.

The power consumption of a transmitter is necessarily high during packet transmission, most of the power likely being consumed by the Tx output stage circuitry. A receiver, on the other hand, can implement a power-conserving procedure. Referring again to FIG. 6, the processor of a receiving device maintains itself in a state of sleep 25 while processing and receiving activities aren't underway; this can be particularly important for certain kinds of devices, especially for end-devices reliant upon battery-power, such as those with solar cells. A receiving device has built thereinto its receiving circuit an automated preamble recognizer, when recognition occurs a signal is sent to a processor to awaken and enter an active state of packet decoding 26. In the example of FIG. 6 an address is used, and the receiving processor performs functions needed to determine if the address in the packet is for its device. If an address is decoded and the packet is determined to be destined for another device, the processor can reset and go back to a sleeping state 25. For maximal power savings, therefore, an address is preferred to be toward the front of a packet, where it will be transited across a channel first before a data body. Where an address matched, or where an address isn't used, a processor enters states of receiving and processing incoming data 27 and post-receipt processing 28 as needed. So in order to keep the processor of a particular device in a non-active state, it is important to positively discriminate the receipt of preambles of packets directed to the device from the preambles of other devices.

Multi-Channel Intermediate-Range Implementations

Existing intermediate-range networks use a common initial DSS frequency and/or channel for communications with devices in that network. This method has the advantage of making setup extremely simple. By this method, other networks may use other initial frequencies or channels, thereby discriminating between members of their respective networks. As such networks change to include interactive devices or grow to large numbers of member devices, the possibility of congestion, collisions and interference becomes a greater concern.

Now turning to FIG. 8, a basic circuit is shown typical of many preset intermediate-range network devices, which can support either single- or multiple-channel operation. The main parts of this circuit are a microcontroller 30 and an RF transceiver 32, which is connected to an antenna 34 located in a position to provide clear communications to other devices. A transceiver 32 may be essentially some analog radio-frequency circuits combined with a logic state machine that permits automatic operation for all or part of a packet transmission or reception. The use of transceiver 32 may leave the microcontroller 30 with additional processing capacity for such things as reading sensors, managing control circuits, etc., which may happen at the same time that packets are transiting a communications channel. Communication between the microcontroller and the transceiver is by way of data lines 39 and interrupt lines 40, by which microcontroller 30 manages the functions of transceiver 32 and transfers packet information received and to be sent. Transceiver has packet buffer 45 sufficient to store all or part of a single packet, read- and write-accessible through data lines 39. Data lines 39 can be varied according to need or capabilities of a transceiver used, while interrupt lines 40 signal to the microcontroller events such as the start or completion of reception of an incoming packet. Were transceiver 32 to be a Semtech SX127x (introduced below), for example, data would be transferred by way of a single-bit wide serial bus using address locations to control registers and access a packet buffer, and data lines 39 would include single lines for in, out, clock and sync. In that example, a packet completion interrupt would be generated by a transition on the DIO0 line. When transceiver 32 is configured for operation on a channel orthogonal to those used by other end-devices, such interrupts would not occur when those end-devices communicate and microcontroller 30 would be left free to sleep or engage in other processing activity.

Microcontroller 30 also contains a packet buffer 44, which is typically larger than the transceiver buffer 45. As packets are to be transmitted, the microcontroller transfers them to the transceiver by way of data lines 39, typically one at a time. Packets received are correspondingly transferred from buffer 45 over the data lines and stored for processing in buffer 44. Apart from this packet data, setup commands are also be sent by microcontroller 30 to program the transceiver for proper operation on a channel, once at initialization for single-channel operation and subsequently with or between packets where more than one channel is used. Where microcontroller 30 has been programmed for multi-channel operation, each packet within buffer 44 may carry with it to channel on which it is to be sent, or parameters thereof.

In an implementation using the Semtech SX127x and digital spread-spectrum, microcontroller 43 also contains a frequency table 43, as described above for FIG. 5. For that implementation, the transceiver 32 has storage only for two frequency settings, which are the one presently in use and the one to be used when it is time for a hop to a new frequency. The transceiver generates interrupts to the microcontroller indicating it is ready to receive the frequency setting, which is subsequently sent over data lines 39 before the frequency hop is to occur. An alternate configuration would put frequency table 43 entirely on the transceiver 32, but for this example a simplified transceiver is used that does not.

Where a transceiver 32 and microcontroller 30 pair is incorporated into an end-device, at least one of a sensor 36 or controller 38 will be included. Sensor 36 could be virtually any sensor, examples of which are a temperature probe, a keypad, a lighting sensor, an entryway closure detector, a motion detector, and a camera. Controller 38 could control a latch, a power switch, a thermostat, a motor speed controller, and many other things. Sensor 36 and controller 38 are connected to microcontroller 30 through data lines 41 an 42, which lines may be of any needed configuration, analog or digital. Where a transceiver 32 and microcontroller 30 pair is incorporated into a hub sensor 36 and controller 38 may be omitted. Instead, a connection to a host processor or network 48 would be included, permitting configuration of and interactions with end-devices at intermediate-range.

While functioning as an end-device, one microcontroller 30 paired with one transceiver 32 are sufficient to operate in an ordinary way. Transceiver 32 is capable of being configured for a desired channel and transmitting or receiving packets to and from a hub, though not at the same time. End-devices do not typically have a need to do both concurrently, so this is usually not an issue. However there are advantages to incorporating multiple transceivers in a hub, as will be presently explained.

Figure 9:
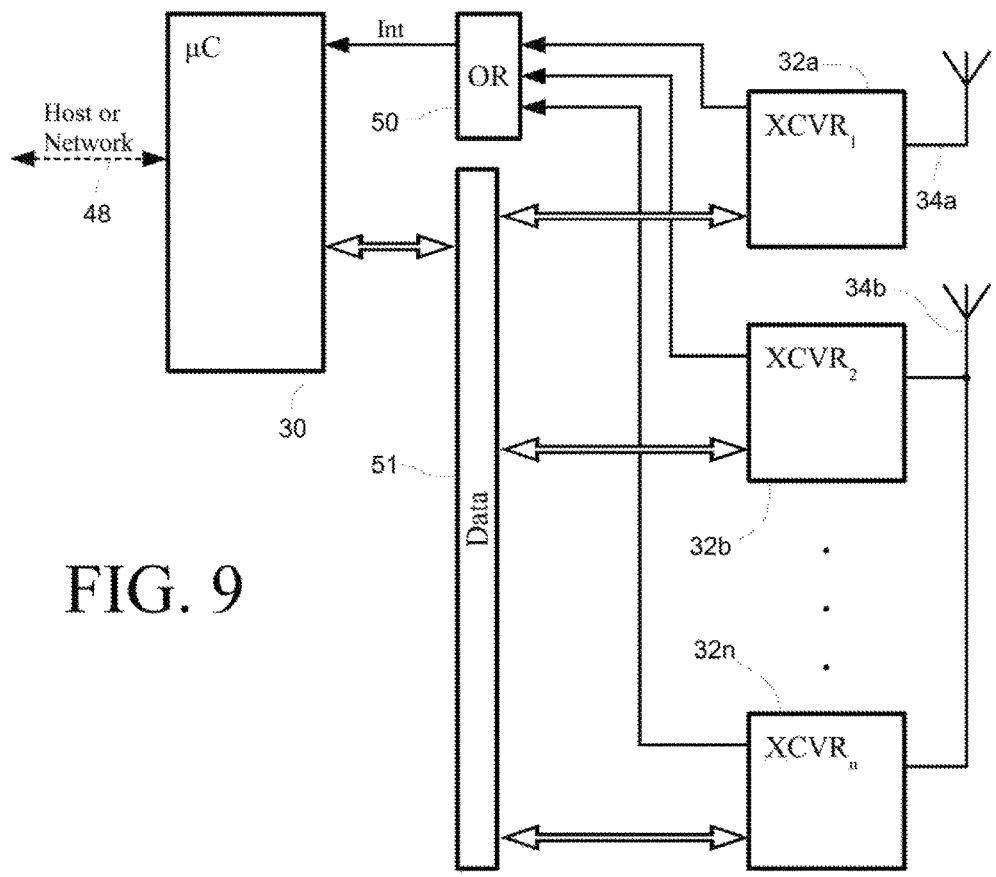
FIG. 9 shows an exemplary circuit architecture suitable for a hub having one transmitter and a number of receivers for simultaneous operation on differing channels.

FIG. 9 illustrates one configuration that may be used in a hub, providing multiple transceiver functionality. Here a microcontroller 30 is connected to n transceivers 34a through 34n by way of an interrupt gate 50 and data bus 51. Included within data bus 51 is sufficient multiplexing circuits to allow the microcontroller 30 to individually address each transceiver. In the example where the Semtech SX127x transceivers are used, this may be done dropping the NSS pin of the individual transceiver to be attended to. Interrupt gate 50 combines the interrupt signals of each of the transceivers such that any interrupt in the group interrupts the microcontroller, and code therein can identify the particular transceiver flagging the interrupt and take appropriate action. In the drawing gate 50 is an OR logic gate, which suffices when all interrupt lines are low in a normal (non-interrupt) state; gate 50 could be AND logic gate if the reverse were true (lines normally high with low signal indicating an interrupt), or gate 50 could be a combination of logic circuits if needed. Now in practice it may be there are a sufficient number of interrupt inputs and general I/O pins on microcontroller 30 such that gate 50 and bus 51 aren't needed, particularly where the number of transceivers n is kept small, allowing for the microcontroller to communicate using parallel lines duplicating the setup and methods of FIG. 8.

The exemplary hub of FIG. 9 has the capability of transmitting and receiving wirelessly with end-devices at the same time, through antennas 34a and 34b. Antenna 34b is connected as an input to each of transceivers 32b through 32n, allowing each transceiver to receive on a different channel as programmed from the microcontroller 30. Depending upon the type of transceiver used, each transceiver may be isolated through filters and amplifiers (not shown) such that the proper impedance at the operational frequency range is preserved. Note that such a tying of transceivers to a common antenna makes them ineffective for concurrent operations in a transmitting mode; therefore microcontroller 30 would be configured to keep them in receiving-mode only. In contrast antenna 34a and transceiver 32a are configured to transmit and receive, having no sharing of antenna resources. Consideration should be given to shielding and to the distance between an antenna that may be used for transmitting and others that may be used for reception, such that potential interference is avoided.

The example shown in FIG. 9 has the capability of transmitting and receiving at the same time, with n-1 receivers monitoring one channel each. Transceiver 32a can be transmitting while all of 32b-n are ready to receive packets as they may transit n-1 channels. Microcontroller 30 may use the transceiver capable of free transmit operation 32a to perform interactive communication with an end-device without channel reprogramming, alternating between sending and receiving over the same channel. Alternatively, when using interactive communication with a particular end-device, microcontroller 30 may command transceiver 32a to switch to different channels as needed for transmissions to other end-devices, allowing one of transceivers 32b-n to receive packet from the particular end-device. If this is done, it is preferred that any transceivers configured to receive on the same channel be turned off, so as to avoid the discarding of packets produced at the hub. Assuming interactions with an end-device are symmetric (packets to and from an end-device alternate and are of the same length), in theory the setup shown in FIG. 9 will support up to two concurrent interactive sessions with two end-devices while at the same time monitoring n-2 other lone-channel end-devices for alerting packets sent spontaneously, or more than that number of end-devices where such channels are shared (using the asynchronous mode described below, for example.)

In practice, the constraints on the number of transceivers that can be used will depend upon several factors. One of these is the speed of data bus 51 against the efficiency of commanding transceiver setup, and sending and receiving packet data. As most of the transceivers of the setup of FIG. 9 are used to receive, this limitation would be experienced in two main ways. First, it is possible to flood the system with incoming spontaneous packets such that they cannot be retrieved with sufficient speed across bus 51. The second way comes into play when single receivers 32 are each used to monitor multiple channels, for example when the number of monitored channels exceeds n-1. The reprogramming of a transceiver 32 across the bus 51 requires some time, and if that time exceeds the packet preamble length, packets will fail to be received. Where more than two channels are monitored by a single transceiver 32, the dwell time on a channel (to detect whether a packet transmission is in progress by an end-device) may exacerbate this problem.

Another limitation of the setup of FIG. 9 relates to a single transmitter. For example, interactive communication can be had with not more than two end-devices where that communication is symmetric. Thus if an event occurs that requires a simultaneous response to multiple end-devices, some of those responses may be delayed beyond a timeout period. This problem can be mitigated through the addition of more transceiver antenna pairs, if those antennas can be placed at a sufficient distance from the receiving ones and if regulations allow. Note that although end-devices can be constructed with multiple transceivers, as in FIG. 9, it is expected that one transceiver will be sufficient for all but the most exceptional circumstances.

Wireless Channels, Orthogonality and Communications Principles

A wireless frequency spectrum can be segmented into definite channels that reduce interference and avoid unnecessary receiver power-up events on non-destination devices. Such channels are preferably "orthogonal" to each other as well, meaning that communication on one channel is very unlikely or practically impossible to interfere with communication on another. In one of the simplest channel designation schemes, each channel is assigned a unique and available center frequency per channel, for example as was done on the now-obsolete analog television spectrum. A one-to-one relationship is made between transmitters and frequencies in a radio locality, and all devices are to use only their assigned spectrum and nothing outside. For example, the 902-928 MHz ISM band could be divided 52 500 kHz-wide channels, or 208 125 kHz-wide ones. Given that an intermediate network supporting ordinary consumers might have a range of many kilometers and thousands of end-devices, that is considered an insufficient number to avoid interference. Therefore further methods of discrimination are preferably used.

Introduced now are certain transceivers made for the LoRa protocol, commercially available from Semtech Corporation, which are identified as the SX127x product line. Note that there are transceivers available from other manufacturers that are equally suitable; these Semtech ones used in this description merely out of convenience as a basis for discussion. The SX127x products are designed to be coupled to a microcontroller handling communication channel configuration and packet management, and have settings for a carrier frequency, signal bandwidth and the number of "chips" per symbol (6 settings), a chip being the smallest datum used in communication. Each combination of those represents substantially a unique channel orthogonal to others, potentially permitting collision-free communication where there is no more than one transmitting device per channel. Using such combinations, two channels may share a common carrier frequency or DSS carrier sequence, while still maintaining orthogonality. Other settings can be used to make additional channels having "partially-orthogonality" including an address, a bit rate, a CRC rate, an encoding type (Manchester/whitening/none), and others according to the manufacturer specifications; note however that the use of partially-orthogonal channels can result in processor-awakening events for packets destined for unintended end-devices, although they can be greatly reduced.

Upon identification of a useful set of channel combinations, a table can be constructed as shown in FIG. 7, each channel having a unique combination of settings useful for communication. In this example, each channel is assigned a spread-spectrum frequency sequence (FS), a spreading factor (SF), and a bit rate (BR) of communication. In one configuration, available frequency sequences are spread evenly over channel assignments, such that the preamble for each channel is sparsely or uniquely used—that is a device transmitting a packet on an assigned channel would use the first frequency in the sequence while transmitting the preamble, followed by the use of other frequencies in sequence. Other channel combinations can be varied in accordance with needs present, for example a frequency sequence could be replaced with an operating frequency where spread-spectrum communication was not used.

Upon determining a set of channel combinations, assignments can be made for individual devices. Again some devices are tolerant along latencies, and no special treatment of these is required. Other devices serve better being on a channel that is free or substantially free of conflicts. The assignment of a channel to a hub and an end-device requires a setting at both, and this could be made by a manufacturer or its representative at the time of installation.

Assignment of Operational Channels from a Hub

Dynamic channel assignment is also possible, that is channel assignments made at the time of use rather than manufacture. One method uses a dedicated default channel and negotiation, by which channel assignments may be made substantially without an ordinary consumer, that is a property owner, electrician or maintainer with ordinary skills, applying configuration steps beyond plugging an end-device in and registering it in an intermediate network. A dedicated channel is selected from a list of available ones, where each end-device starts on or returns to when there is a lack of confidence in a present channel assignment. Particular channel assignments are managed by the hub to which an end-device is to be paired, which assignments can be by several means as discussed below. The procedure to which channel assignments are negotiated depends upon whether communications with an end-device are prompted or spontaneous, or in other terms synchronous or asynchronous with respect to hub communication on the default channel.

In synchronous mode, all communications from end-devices are made in response to a request or permission from a hub. A hub transmits a packet to each end-device in turn, granting (explicitly or implicitly) the end-devices a window in which to respond. In analogy, the hub acts as a chairperson to a room full of speakers, the chair deciding who should speak and when, each end-device only "speaking when he's spoken to". In asynchronous mode, an end-device sends a packet when it is ready, potentially at the same time as another end-device that causes a packet collision. A hub responds to an end-device with a packet acknowledging (again either explicitly or implicitly) receipt of the end-device's communication. After a time, if a transmitting end-device does not receive that acknowledgment, it may retransmit the packet as many times as needed. This is analogous to a room full of people who may potentially speak to a chairperson whenever they wish to "out-of-order". Either mode of communication can be used on a default channel, and indeed a hub can he designed that uses only one mode or switches between both, depending upon the need.

Figure 10:
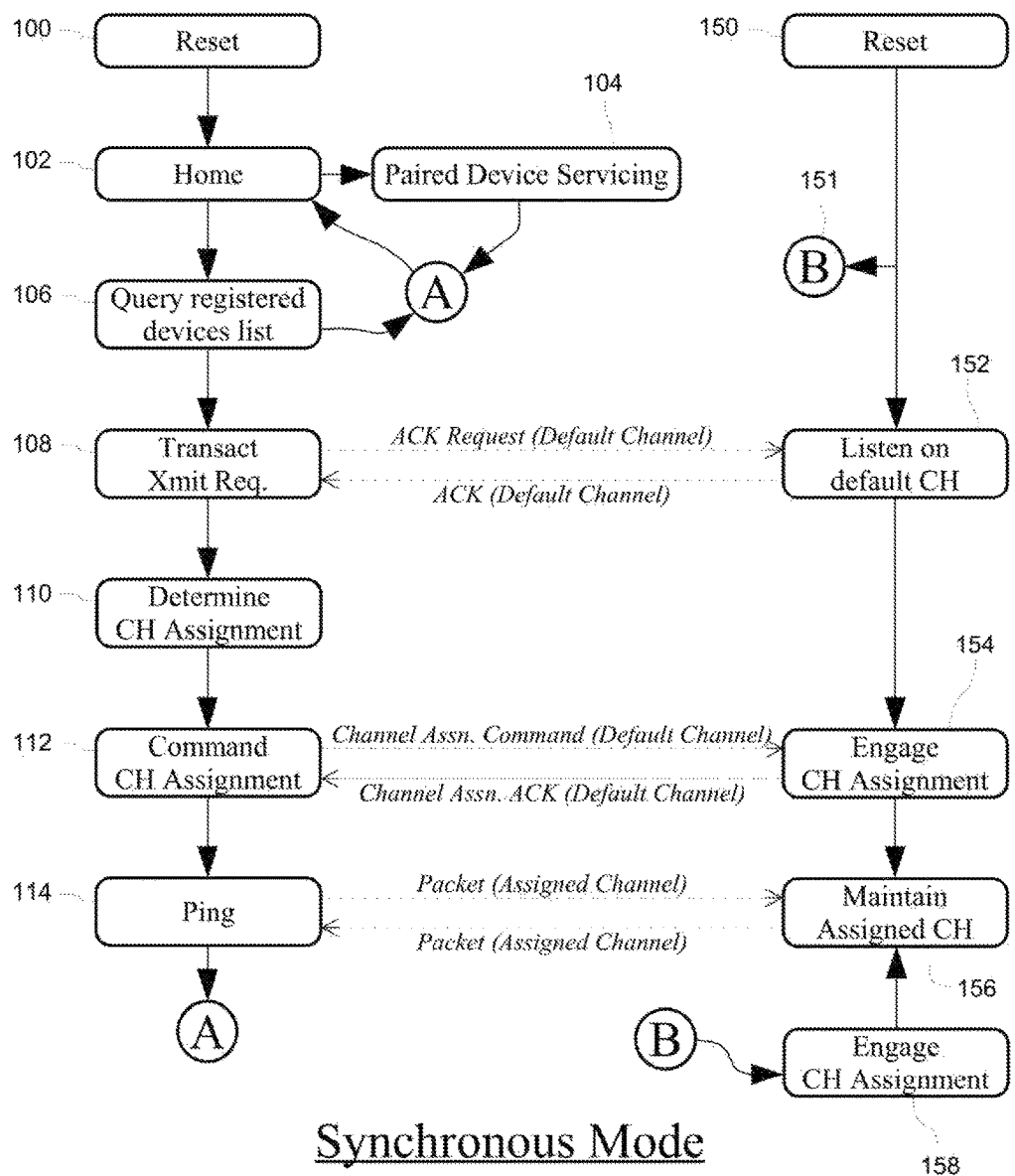
FIG. 10 depicts a typical set of states for a hub and an end-device being configured from a default initialization channel in synchronous mode to operate on an assigned channel.

Now depicted in FIG. 10 are state-machine representations of a channel negotiation between a hub and an end-device using a synchronous mode, with successive states generally proceeding down the page. Each starts in a reset state on power-on, 100 and 150 for the hub and end-device respectively. On reset 150 the end-device completes some initialization activity, after which one of two things happens.

If the end-device has non-volatile memory and if a channel assignment is found to be stored therein, the device can skip 151 the channel assignment procedure and simply set up the communications hardware for the saved channel and resume operation as in step 158. Otherwise the device enters a state of listening for an acknowledgment request on the default initialization channel 152. The end-device may leave this listening state intermittently or as needed to manage other needs, as responding to such a request is not a critical action. As an acknowledgment request is first used by the hub to confirm communication in the moment, that request can be any packet that elicits an immediate response from the device, indicating it is in a state to receive a further command.

From initialization, the hub proceeds to a home state 102. The servicing of devices already paired will ordinarily take priority over pairing end-devices, and according in its ordinary operating state the hub will first determine whether there are any already-paired devices that need to be serviced. If so, the hub enters a servicing state 104, performs various activities depending upon the end-device type getting present, attention and other factors, and returns home 102 when finished. Otherwise, the hub enters a query state 106 in which the list of registered end-devices is checked for ones that are needing to be paired with and possibly assigned to an operational channel.

Conceptually, the list of registered end-devices provides a way to give each hub awareness of which end-devices should be serviced, as there may be end-devices owned or operated by others within radio locality that should be ignored. On a hub, this list can exist by itself or as a part of other data or structures. In a synchronous mode, this list is most simply a list of unique identifiers (UIDs) by which intended end-devices may be recognized and addressed. Ordinarily this list will also contain a flag or information that indicates whether a device is paired, and the channel to which the device is assigned or the parameters thereof. This list may, if desired, keep other information such as device types, times of previous communications, battery information, servicing requests, error information and many other things. The hub provides a way to edit and reconfigure this list, such that the list may be changed as end-devices are added to or removed from a desired system. In one example, a hub contains a network port, an HTTP server, and server software that permits the editing of the list through a browser on a connected network computer. In another example, the list is maintained as a file on a memory device that can be inserted into the hub where it can be read. In a third example, the hub has a proprietary port and protocol permitting a technician access to the list from specially-designed programming tool. And in a cloud-based example, the hub may make an Internet query at determined times for changes to be made to the list, adding newly registered end-devices or redacting ones as needed. The way in which the list of registered end-devices can be accessed may be widely varied according to the specific form of the hub and interfaces provided therein.

When in state 106 the hub identifies a registered device needing to be paired, it moves to a new state 108 in which the unpaired device is queried. The choosing of an unpaired device to be serviced can be at random, or by another ordering method, for example one that prioritizes the channel assignment security devices over others. Such a querying is by way of the default channel, and accordingly the hub changes the transceiver used to match the parameters of that channel. In state 108 an acknowledgment request packet is sent to the unpaired device, again on the default channel, which will result in either receipt of a packet acknowledging the request or a timeout. The acknowledgment packet contains an identifier of the destination end-device, which may be the device's unique identifier (UID). A timeout indicates that the unpaired device is off, out of range or unavailable in some other way, and accordingly no further transaction attempts with that device are needed. The hub returns to the home state 102 on a timeout.

If the end-device is listening in state 152 on the default channel and receives a packet from the hub identifying the device as the destination, the device responds within a set time with a return packet in acknowledgment. Upon receiving the acknowledgment packet, the hub moves from state 108 to state 110 where a channel assignment may be made. Now, a state 110 where a channel is assigned is optional where channel assignments have been made previously. Channel assignments are dependent upon the particular end-devices to be used with a hub, among potential other things. One assignment scheme is to segment the devices between those that will tolerate communication latency from those that won't, and assign channels for the latter. Another scheme assigns channels to battery-operated devices so as to keep traffic to and from other devices off-channel, potentially saving power. Where Channel assignments are made on-the-fly, as might be done if state 110 is included, channel assignments can be made to ones that are least-populated Other assignment schemes can be crafted in accordance with the network environmental conditions, the devices used, and other factors as desired.

Upon determination of a channel assignment, the hub then enters a state 112 to attempt to communicate that channel assignment to the as-yet unpaired device. A command is sent to the end-device to make the channel assignment, which is now in or now enters state 154 to engage the new assignment. Note that this command may be received while the end-device is listening generally in state 152, if the communication protocol allows. The channel assignment command may either contain the channel parameters as explained above, or it may be a reference to the parameters, for example in a table of channels indexed by a number. Upon receiving that command, the end-device preferably sends back and acknowledgment to the hub that the channel assignment is accepted, following which its RF circuitry is configured for operation on the assigned channel. If non-volatile memory available, the new channel assignment may be saved at the same time. Once the channel assignment has been put into effect, the hub and end-device then proceed to states 114 and 156, respectively. If there is any remaining setup to done, it can be managed through communications on the assigned channel with the hub and end-device in those states.

It will sometimes be important for the hub to test a channel assignment periodically, which is a kind of guarantee that an end-device is active and communicating properly. In state 114 the hub sends a "ping" to the newly-configured end-device, on the newly assigned channel. After engaging the assigned channel to its radio transceiver, the end device maintains it communication 156 on the assigned channel, and in many cases uses the assigned channel for all further communication with the hub until a reset or until a further channel assignment is made. Any packet returning a packet in response can act as a ping, and the hub may send pings when it is in the usual paired device servicing 104. The failure to receive a ping at an end-device within a set time may cause it to enter a final-safe procedure, essentially returning to state 152. Similarly, the failure of an end-device to return a packet in response within a set time may indicate a failure of that device to communicate in the assigned channel, and the list of registered end-devices can be updated to indicate that a device is no longer paired or a channel assigned. As conditions change in the radio environment, new channel assignments can be made by the hub for an end-device by the issuance of a channel assignment command on the presently assigned channel, or by waiting for a fail-safe event at the end device and then following the procedure of FIG. 8.

Figure 11:
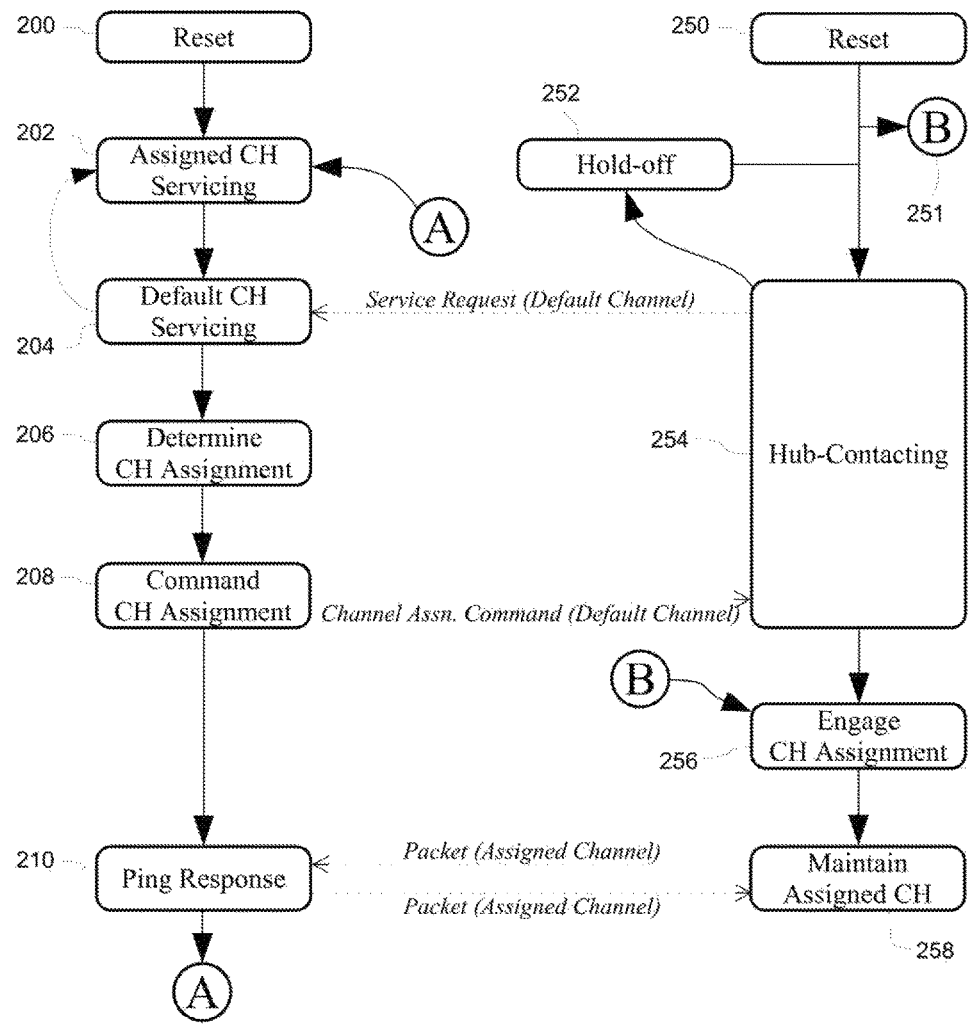
FIG. 11 depicts a typical set of states for a hub and an end-device being configured from a default initialization channel in asynchronous mode to operate on an assigned channel.

Now turning to FIG. 11, a channel negotiate is represented using an asynchronous mode. In this example, the hub has a single transceiver that can switch between channels. In asynchronous mode, the hub in normal state 202 scans through the assigned channels, waiting for transmission of a packet from a paired end-device. In some encoding schemes, including FSK, a packet under transmission can be detected by the presence of a signal for a short time, perhaps the length needed to transmit a single symbol. Note that it isn't necessary to scan any unassigned channels, that is channels that are available but for which no end-device as been commanded to operate it. While scanning the assigned channels, the default channel must be left unserviced. Periodically, however, the default channel may be serviced 204. If no activity is detected, the hub may return to servicing the assigned channels 202.

The end-device starts from reset and initialization 250, and as in synchronous mode if a channel assignment is stored in non-volatile memory the device may skip 251 the channel assignment procedure, going straight to setting the RF electronics parameters appropriately 256. If no channel assignment can be determined at reset, the end device proceeds to a hub-contacting state 254, in which the device attempts to be serviced by the hub. The end-device transmits packets intended for the hub, those packets including a unique identifier and indicating the presence of the end device on the default channel. Immediately following a service request packet, the end-device listens for a response.

Now in asynchronous mode there are two main failure modes of communication. The first of these is caused by the hub not being ready to receive a packet on the default channel, either because it is set to receive on another channel or because it is servicing other processing needs at the time. The second of these is from collisions, that is other end-devices that happen to transmit packets at the same time as the one attempting to he serviced. Either way, if an end-device doesn't receive a packet from the hub within a set time, a hold-off state 252 is entered to give the failure mode a chance to clear. The end-device remains in hold off state 252 for a period calculated to be likely to avoid the failure mode, for example an exponentially-increasing period with some randomization to avoid other-device collisions, following which the end-device returns to the hub-contacting state 254.

Eventually, the end-device will be successful in sending a service request to the hub. First, the hub verifies that the end-device's UID is in a list of registered end-devices. If a packet is received that is from a non-registered device, it is assumed to be registered with a different hub and ignored, in which case the hub returns to state 202 to service devices on a different channel while the default channel is occupied. If a packet is received from a registered device, a channel assignment is then determined 206 for the end-device that requested service, which is similar to that in the synchronous mode, and if a channel assignment has been made, the hub need only look up the channel or its parameters. Once a channel assignment has been determined for the end-device, the hub proceeds to state 208.

The hub in state 208 sends a packet back to the end-device containing a command with the channel assignment or the parameters thereof. Ordinarily it will be important for this determination to be made quickly, so the channel assignment command packet is sent promptly to the end-device, which is waiting for it after having sent the service request. Note, however, that it is possible to utilize a Cloud-access for the reading of the registry or the channel assignment, provided the end-device is configured to remain in state 254 for a longer period of time (perhaps seconds) before proceeding to the hold-off 252. Upon receipt of a channel assignment command, the end-device proceeds to state 256 where it switches its RE circuits to the new channel. If non-volatile memory is available, the new channel assignment may be saved at the same time. When done, the end-device proceeds to a normal operational state on the assigned channel 258, Any remaining setup to one can be managed through communications on the assigned channel with the hub and end-device in that state.

In an optional confirming mode of operation, the hub switches to the assigned channel and then waits for a period of time 210 for a packet to arrive on that assigned channel from the end-device. That packet can be a simple ping, or it can contain further information, requests or a command response from the end-device. Regardless of whether the channel assignment is confirmed, the hub returns to normal operation and state 202 for further end-device servicing. Where the confirming mode is used, it is preferred that the end-device wait for a short and fixed period of time calculated to allow for the configuration of the RF circuits before sending that packet so the hub can confirm and resume without unnecessary delay.

The LoRaWan protocol, particularly Classes A and B, use a mode of communication similar to the asynchronous mode described above, although only on a single channel with a single set of RF communication parameters. With the use of channel assignments comes a problem not experienced in LoRaWAN networks, which is this; where there are end-devices that do not store channel assignments in non-volatile memory, a power interruption can cause a large number of coinciding service requests for channel assignment, which for the asynchronous mode can flood the default channel and cause packet collisions and large delays in the restructuring of the intermittent network when power is restored. Furthermore, as in asynchronous mode end-devices are not ordinarily aware of each other, a prioritized channel assignment restoration can be difficult, potentially resulting in long periods of unavailability for critical devices. For this reason, where there are to be mains-powered end-devices that do not save their channel setting to non-volatile memory, the synchronous mode of communication is preferred.

Furthermore, even though a hub and an end-device may use a synchronous or an asynchronous mode of communication while using a default initialization channel, that mode may be varied after a channel has been assigned and set. This may be particularly helpful for devices that have urgent data to submit, such as security alarms or critical equipment failure messages. For example, a battery-powered perimeter end-device might initially use a synchronous communications mode on an initialization channel, following which it operates on an operational channel reserved for security alarms in asynchronous mode, transmitting wireless packets immediately and without prompting by a hub in the event intrusion detection, continuing until a hub acknowledges receipt.

In the description above, communications are largely sent in the clear permitting interception of packet data, which may permit an outside party to snoop on the channel assignment activity and potentially to interfere with channel assignments of end-devices. In this way, a malicious party might inject unauthorized commands into the network (for example commanding door latches to open), snoop on the state of alarms, or commanding end-devices to switch to faux channels effectively disabling them. For this reason it is desirable to include security measures in the communication protocols to prevent this kind of attack. If LoRa-compatible hardware is used, then one security measure is to use a network session or application key, by which packets can be encrypted and unauthorized packets rejected. An additional security measure encrypts the UID of devices, such that all nodes on an intermediate network require possession of a key to decrypt the identity of the source or destination end-device; in this way the UID is never sent in-the-clear, making the acceptance of faux packets much more difficult for a malefactor to achieve. In another security method where digital spread-spectrum transmission is used, the frequency sequence is changed periodically by the hub, through a command to change channel parameters that include a new seed for the pseudo-random generator used to generate the sequence. A return to the default channel provides a fallback state in the event a hub and an end-device lose synchronization.

In a further variation, an assortment of default channels can be assigned and configured at the time of manufacture, selectable by the consumer at the time of purchase without a configuration step. In one example, hubs and end-devices are made with a default channel being selected from n preset ones, with each device being set at random, by an even distribution, or by some other scheme. The products are made available with different product codes or names, such that a purchaser can select the correct one with his desired default channel. For example, a purchaser having set up a hub on default channel 2 would purchase end-devices set to the same, and thus the step of configuring the default channel by the installer is avoided, while at the same time conveniently permitting several intermediate networks to reside in the same radio locality with minimal interference on their respective default channels.

Channel Condition Measurement and Interference Countermeasures.

An optimal channel is one that conveys information reliably and efficiently. In the real world there is background noise and sources of interference to overcome, so in an optimal channel is generally one that has the maximal data rate while at the same time keeping errors at a tolerable level.

Conventionally, this balance is achieved by considering the worst circumstances foreseen within a specified environment and range, and setting communications parameters such that communication will never be unacceptable, Where intermediate-range networks are used that, practice can yield large inefficiencies in the use of a communications spectrum, as most of the time conditions will be much better than the worst.

In order to bring continuous efficiency, adaptive measures can be implemented. These consider the range of noise and interference that can be present, measuring them and changing communications parameters appropriately. For example, where two devices are communicating through an outdoor pathway, changes in humidity and precipitation will affect the attenuation of signals therethrough. Likewise, metal objects such as vehicles may be moved in the environment, changing reflections and changing blockages in the pathway. A network having a moving device included may similarly experience wide changes in signal strength and other factors. Thus an intermediate network that can adapt to present conditions is more resilient and capable than one using conventional anti-interference measures.

Countermeasures to interference can be divided between those that use avoidance and those that use redundancy, and both kinds of countermeasures can be used in an intermediate network. The avoidance strategy relies on the changing of frequencies or channels, essentially relocating devices in the spectrum to areas where the interference isn't present. This strategy is more effective against interference produced by collisions with other devices: if other devices are transmitting on the same channels at the same time, a relocation to a different channel may remedy the problem. This strategy is less effective, however, against situations where there are noise sources in the environment that are "bursty" (of short duration) or where the path between devices yields a low signal-to-noise ratio.

In contrast, the introduction of in-packet redundancy can help devices to overcome interference by extraction of duplicate information in spite of interference, which in many cases affect only a single bit of a packet or a large part thereof. Interference consisting mainly of frequent small impulses, such as that produced by switches, motor brushes and saturated amplifiers, can often be overcome by this method. Where large redundancies are used the random variations in the background noise, significant where a weak signal is present, may also be overcome. Collisions between devices that share a common format or protocol will remain out of reach though redundancy countermeasures, essentially because a receiver will not be able to discriminate between signals of co-transmitting devices.

Countermeasures using redundancy take a number of forms, but each essentially transmits information to be conveyed multiple times or in multiple formats, such that that information can be extracted even in the present of limited noise and errors. For example, single bit errors in a set of bits (a word or a byte) can be overcome through the use of forward error correction (FEC). In another example, a bit value may be transmitted multiple times, the receiver considering the value received the most times the one intended; this method is used in the LoRa protocol, the amount of redundancy applied being selected by a "spreading factor" setting. In contrast, the inclusion a cyclic redundancy check (CRC) does not allow for recovery of error-modified packets, will require packet retransmission, and is not an effective redundancy countermeasure.

The use of a redundancy countermeasure necessarily introduces inefficiency in communications, as each datum requires a longer time in transit. For example, a packet using the LoRa specification and a spreading factor of 6 will require $2^6$ bit-sized slots to communicate each individual bit, making the time-in-transit 64 times longer than what would be needed if that redundancy was not used, making the time of channel occupation much higher. The use of redundancy to that particular degree, however, permits effective communication of a signal that is up to 15 dB weaker. Note that although the Semtech 127x components have circuitry onboard for this kind of redundancy, it can still be done in software, as can forward error correction and other redundancy-introducing methods. Likewise, redundancy to a lesser or a greater degree can be employed as needed. The use of lesser forms of redundancy is preferred, if conditions permit, because more devices can share a channel and latency will be reduced.

Figures 12, 13:
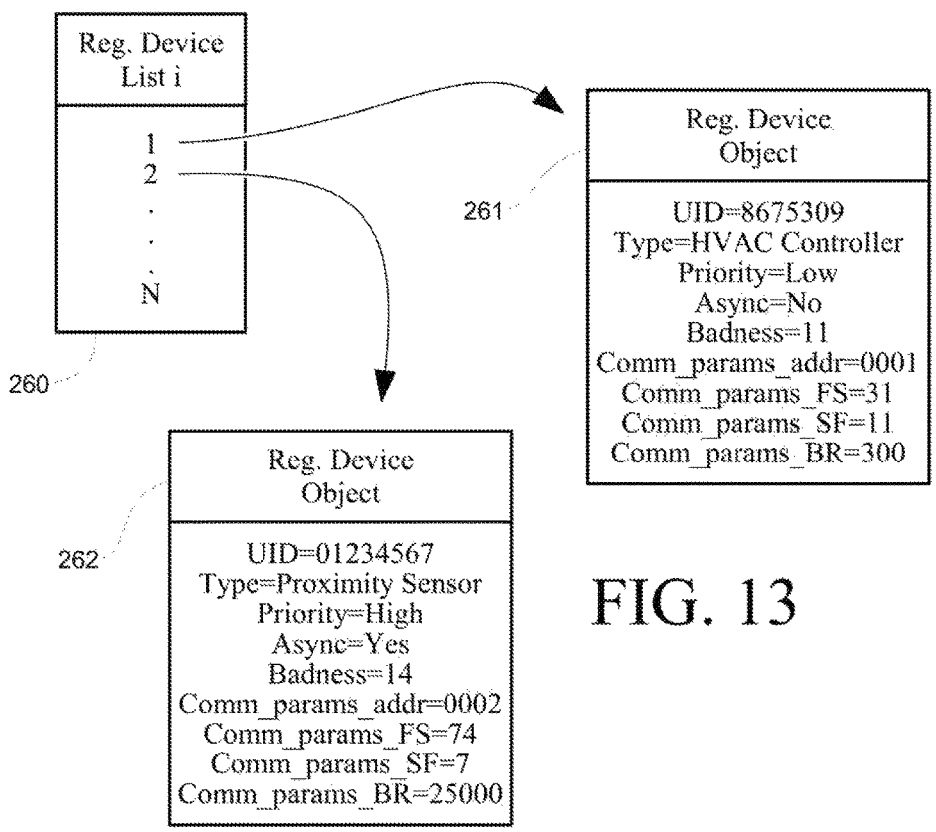
FIG. 12 illustrates a scheme of sub-channels organized under a set of base channels, the scheme including a redundancy parameter and directives for sub-channel switching.
FIG. 13 depicts a memory structure retaining communications parameters, qualitative channel information and other device-specific information for individual end-devices operating in synchronous mode.

Although there can be many channel schemes for use in the application of interference countermeasure adaption, the fixing of one beforehand may provide a definite path through levels of redundancy, which can be particularly helpful for communication between paired devices each having a single transceiver. One such scheme uses groupings of sub-channels providing individual levels of redundancy, each organized under a set of channels. Illustrated in FIG. 12 is such an exemplary organization usable with the transceiver hardware included within the Semtech 1272 components, providing for adaptive redundancy in a variable interference environment. In this exemplary scheme, 160 base channels are defined, each with a digital spread-spectrum frequency sequence. The RF spectrum from 902 to 928 MHz is divided up into 160 unique frequencies $F_0$ used in the preamble of packet transmission as described above, providing general orthogonality. With additional redundancy parameters, under each base channel are defined "BC+R" sub-channels A-F, the redundancy parameter being the spreading factor SF varying between 6 and 12, which provides for the duplicate transmission of each symbol between 64 and 4096 times. In this exemplary scheme the spreading factor SF=9 is not used, which could be reserved for other devices or purposes. Now there are other parameters that could be employed to make other sub-channels, such as a bit rate or an FEC setting, but to provide simplicity of discussion the example shown here only uses the spreading factor to provide variance in redundancy.

Each BC+R sub-channel contains R+ and R− directives used to guide devices when making changes to redundancy in adaption. So, for example, a device operating on sub-channel A and determining that more redundancy is needed would apply the R+ directives and switch to sub-channel B, changing the spreading factor from 6 to 7. Similarly a device operating on sub-channel D would move to sub-channel C if less redundancy was needed, changing the spreading factor from 10 to 8. Other methods can be employed to calculate a sub-channel for future use, but it is expected that a table such as that shown will suffice for most applications. It is further to be understood that although these BC+R channel sets as shown share a common $f_0$ frequency, that is not required. Any channel can be made a part of such a channel set using any frequency, frequency sequence, or other parameters, such that R+ and an R− steps can be taken that generally provide increased or decreased redundancy to the devices in use.

Also in the scheme of FIG. 12, a fail-safe "FS" sub-channel is included where a device can resort in the event that contact is abruptly lost with a paired device, such as could happen if a source of interference was suddenly introduced. Here the FS settings are for sub-channels C and F; as sub-channel C is much faster than the highly redundant sub-channel F, it is the first resort where low-levels of redundancy have been needed. In an alternative, a fail-safe sub-channel could be omitted, relying on an expectation that channel conditions are likely to improve or a packet retry will eventually get through.

The initial sub-channels may be selected as desired. In one example, the fail-safe channel having the greatest redundancy is used on power-on and reset. This provides for two devices to connect and synchronize communications on power-on or at loss-of-communication, without the involvement of other end-devices or hubs. In another example, the sub-channels may be set by a hub as shown and described in connection with FIGS. 10 and 11, in conjunction with or in substitution of an operating frequency, as desired. The specific way that initial sub-channels are selected is not critical, it is important only that devices to communicate synchronize on a common communications channel.

With that in mind, it is important to be aware that where communications with a hub are involved, it may be generally preferable for the hub to specify operation channels and redundancy, so that management of communications may be managed generally across all devices in a wireless network. Individual end-devices will not ordinarily maintain an awareness or information of communications other than that being conducted with the hub to which they are registered. A hub, on the other hand, maintains the status configuration of all operational channels presently in use, and can avoid switching devices to channels that may produce interference, collisions or other unintended consequences.

A redundancy scheme as illustrated and described for FIG. 12 is particularly useful where a hub communicates with a number of end-devices in a synchronous mode, as described above. As no other end-device other than the one responding to communication from a hub is permitted to be transmitting on a channel, the sharing of a channel or a sub-channel with multiple devices does not produce collisions with other devices registered to the same hub. In the system shown in FIG. 9, for example, transceiver 32a might be set for all communications in synchronous mode, and that transceiver would expect to receive packets from at most one registered end-device at any given time. Transceiver 32a could be used to transmit packets to any registered device, synchronous or asynchronous. The default initialization channel, as described above, may be set to the sub-channel in a scheme with the greatest redundancy such as sub-channel F in the table of FIG. 12, if operational channel assignment is made using a synchronous mode such as that described in connection with FIG. 10. In that way, the default channel may operate as a fail-safe and provide the optimal chance of overcoming any interference present in the environment.

While in operation, the quality of communication between a hub and individual end-devices may vary widely. Some end-devices may be located nearby with an unobstructed path, providing a high signal-to-noise ratio to the background and reliable communication at high rates and low redundancy settings. Other end-devices may be located at some distance from a hub, for example in other buildings perhaps miles away, where a high amount of redundancy is needed to communicate reliably. Although a hub could use a single channel or redundancy setting for all end-devices using a synchronous mode, there are at least two reasons not to. First, end-devices located on different channels avoid wake-up events for packets destined for other devices, saving power and computational resources. Second, as packets transmitted with higher redundancy generally require more time on-air, the use of lower levels of redundancy frees a transmitter at the hub for additional communication at higher data rates or higher numbers of registered end-devices. Because of this, it can be helpful to manage redundancy and channel parameters for each individual end-device associated with a hub.

With that mind, a hub may retain communications parameters for individual end-devices in a structure as shown in FIG. 13. In the example, a list 260 of N objects is maintained by the hub, one object per end-device registered. In an alternative implementation, a list 260 may contain objects only for the end-devices using synchronous communication, with devices using asynchronous communication being assigned to common channels for which communications parameters are maintained separately. Over time, list 260 may grow and shrink as devices are registered or unregistered to a hub. Each object in list 260 contains the information needed for communication with end-devices, and optionally other information including such things as identification type, state, etc. as desired.

Shown in FIG. 13 are two such exemplary objects of potentially many, one object 261 for an HVAC controller and another 262 for a security proximity sensor. As shown, the proximity sensor communicates asynchronously with the hub as events occur, and correspondingly object 262 indicates so and that communications be prioritized highly with respect to other devices. The HVAC controller requires programming and monitoring at infrequent and non-critical times, and correspondingly object 261 indicates synchronous communication with a low priority. Each object further includes the unique identifier of each end-device, and a type recognized by the hub indicating how is treat each device. The communication parameters for each registered end-device are retained in these objects, here including settings for an address, a frequency sequence for DSS, a spreading factor and a bit rate. A communications quality "badness" value is also kept for each end-device, generally rising as communications between the hub and the device on the current operational channel become more problematic, the use which will be described shortly.

A hub communicates with registered end-devices in a regular way, using the information retained for each end-device. A hub will communicate with each end-device registered for synchronous communication in its turn, setting one or more transceivers using the communications parameters stored for each device beforehand. Were one transceiver to be used for synchronous communication exclusively, the communications parameters could be set that transceiver for a particular end-device immediately before an outbound packet is sent, leaving those settings through any prescribed period of response. Thus although each end-device could use an entirely different set of communications parameters, regular communications may be made with all of them in a synchronous mode with a single RF transceiver set.

Figure 14:
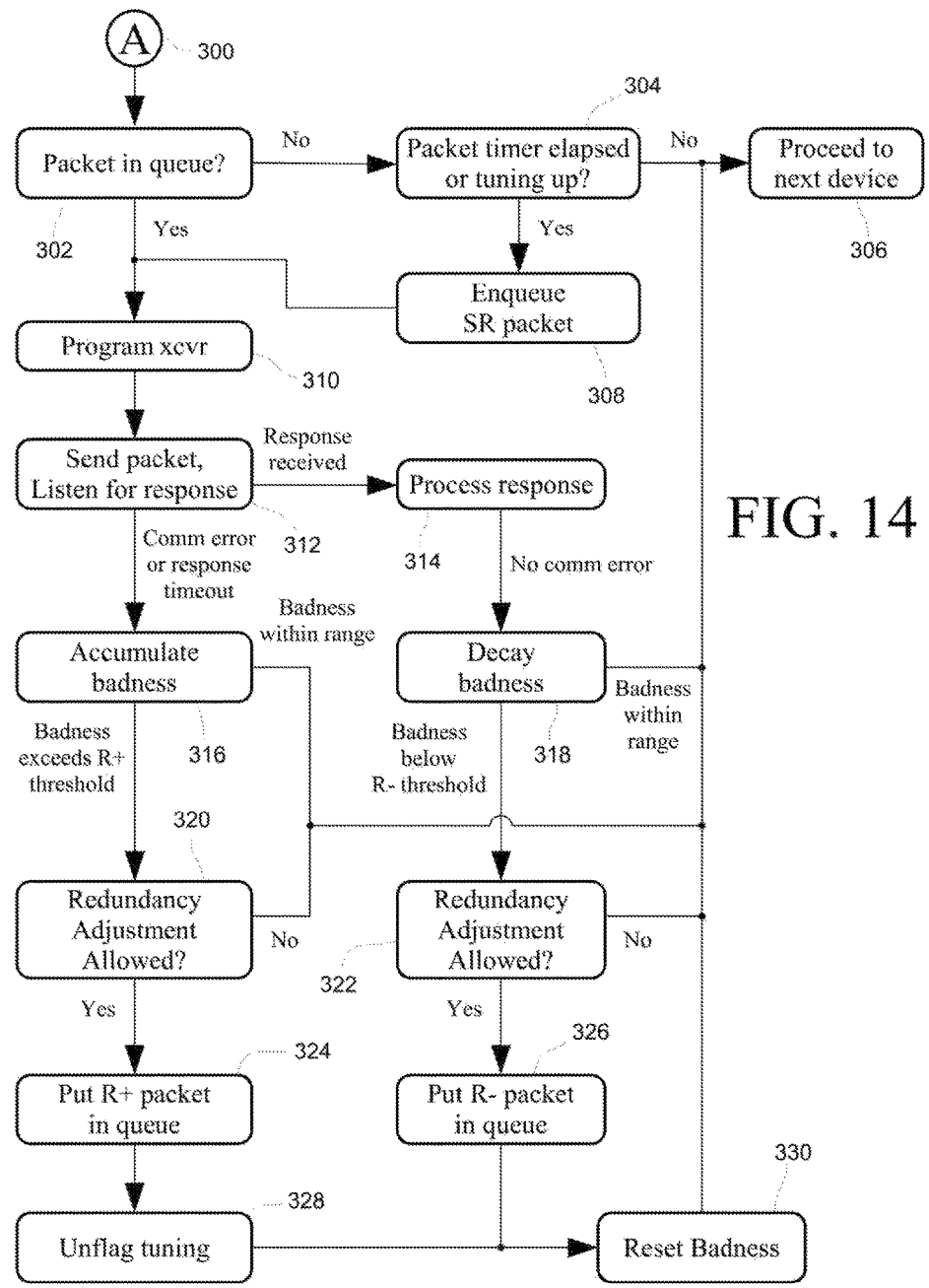
FIG. 14 depicts a state machine for interacting with individual end-devices in synchronous mode employing communication through a packet queue, a quality measurement of a present operational channel, and adaption in varying amounts of redundancy.

Having introduced a data structure useful to track various aspects of devices registered to a hub, including appropriate communications parameters and quality tracking, discussion now turns to a state machine and corresponding method useful to manage redundancy for a group of end-devices communicating in synchronous mode, as depicted in FIG. 14. For each end-device registered with a hub traversal though the states in that figure implement an adaptive redundancy procedure, each traversal being performed for a single end-device in a successive and discrete time-slot. Thus a hub will service a number of end-devices assigned to use a synchronous mode, and service for each of those in through repeated cycles through the state machine entering a "A" 300. A hub may communicate with many end-devices in synchronous mode, and traversal through the machine and state 300 may repeat in succession as many times as needed for an individual device, or may be limited to one or a number of traversals between devices as desired. The particular sequence in which end-devices are serviced is not critical for the purposes of redundancy adaption, so song as each device as an opportunity to iterate through with sufficient frequency and regularity.

That said, it may be desirable to start end-devices on a channel with high-redundancy so as to initialize reliably, while at the same time moving those devices through initialization to channels with lower redundancy quickly to maximize response time and the efficiency of hub and RF spectrum resources. With those goals in mind, the state machine of FIG. 14 considers a "tuning up" time and state for end-devices presently under initialization in the network, which state can be included in a registered device object as shown in FIG. 13. An end device that is tuning up its redundancy may be given more opportunities to traverse the state machine and reach a more efficient redundancy in less time.

For the state machine corresponding procedure of FIG. 14, an outgoing packet queue is kept for each individual end-device. Each queue may be filled with communications appropriate to the type of end-device being serviced. These communications may be commands of interaction with sensors or mechanisms under control of an end-device, requests for information, commands to change communications channels or parameters, and others as needed. The hub manages each queue, inserting, deleting or rearranging packets as operations proceed.

The passage of end-devices through an adaptation procedure such as that of FIG. 14 may be through any regular sequence. In one example, the hub simply iterates through a device list 260, acting for each end-device listed in simple succession. In another example, the hub is considerate of those devices having a high priority, allowing them to iterate through before other devices of lesser priority. So, for example, the object 262 for a proximity sensor end-device specifies a high-priority treatment, and correspondingly if packets were present in the buffer for that device it would be allowed to traverse the state-machine of FIG. 14 before other low-priority devices.

Turning to the specifics of FIG. 14, the machine first considers 302 whether there is a packet in the outgoing queue. The presence of an outgoing packet, for the purposes of redundancy adaption, is an opportunity to evaluate the present condition of communications with a device using the present channel and/or parameter settings. Now it may be that there is no outgoing packet in the queue of the end-device under consideration, in which event the machine goes to state 304 and evaluates whether that device is presently in the process of tuning up. If not, there is no need to send an outgoing packet and the machine proceeds to examine the queue of the next end-device 306. However if the present device is being tuned, the machine takes advantage of the opportunity and enqueues a status-request "SR" outgoing packet 308 and which point there is a packet to be sent. An SR packet is simply a packet that elicits a response from the current end-device, which packet can carry other information or requests if desired.

Regardless of whether an outgoing packet was placed in the queue in operation 308 or separately, the machine proceeds to program a transceiver to transmit it 310. This programming might include a frequency, a modulation type, a bit rate, a pointer to a buffer containing packet data, a spreading factor, a transmission power setting, a forward encoding setting, a preamble length, settings for DSS frequency hopping, and other settings used to match the transmitter parameters to those of the receiver on the current end-device, which settings again might be located in an object stored in memory. Following that programming, the machine proceeds with transmission of the packet at the top of the queue 312, and an attempt to receive a response from the current device. The result will be one of (1) reception of a valid response, (2) reception of a response with detection of a communication problem or (3) a timeout.

A timeout in this context means the hub did not receive a response, which means that either the current end-device did not receive the outgoing packet, or the device received the packet but the hub did not receive the reply. A communication error differs in that a reply id received, but an error of some kind is detected either by the hub or the current end-device. For example, if a CRC error is detected in the response packet from the end-device, that is counted as a communication error. Likewise, if the end-device receives a packet with a bad CRC, a bad command or a protocol error, that is a communications error that can be flagged in the device's response packet. So in this example, a communications error may mean reception of a response packet that indicates anything but the absence of error in the communications conducted while in state 312.

As shown, machine of FIG. 14 treats all communication errors the same, considering the quality of the wireless link between the hub and the end-device to be symmetric. The device objects of FIG. 13 include communication parameters used for both traffic to and from a hub or device. Practically it may be that a source of noise is present either in the locality of the hub or the end-device, and that all that is needed is redundancy in the transmission to the receiver in that region. However for the purposes of this example, the hub and the end-device presumes that an equal amount of redundancy is needed, and both transmission to and reception from an end-device are conducted with the same communication parameters. An alternate method applies redundancy in an asymmetric fashion, including communications parameters for each direction of traffic, for example stored in a device object at the hub and the same at each end-device. Detection of where problems lie can be resolved by examining each direction for problems, for example by including a packet serial number in each packet transmission attempt, by which missed packets can be detected on subsequent packet exchanges. An end-device can flag or count the number of packets noticed to be missed, and in such a way the hub can detect a problem with traffic to that device which redundancy can solve.

Returning back to the machine in FIG. 14, if a valid response is received from an end-device, that response is processed 310. This response will contain information corresponding to the outgoing packet earlier sent. For example, if an outgoing packet were sent to the HVAC controller to set a thermostat temperature, that end-device could reply with an acknowledgment, perhaps confirming that setting back to the hub. If the outgoing packet were a simple service request, the response might be a packet containing merely the address of the current end-device. A response may contain further information such as a flag that further information is pending for transmission from an end-device, an operational status, a battery level, a flag indicating manual intervention, and many other things. The way in which responses are processed is not important for adaption in redundancy; it is only important that processing occurs for general operation.

The machine of FIG. 14 uses an exemplary "badness" value that provides a general quality metric on the communications between the hub and each end-device, that value being stored at the hub such as in a device object. Recognizing that that quality can change over time, that value is permitted to be changed as communications occur such that it can accurately reflect current conditions in the environment. The badness value is increased 316 where a communications problem occurs, and decreased 318 where communications are clean and effective. The machine uses two values that trigger a change in redundancy, which are the R+ and R− thresholds, indicating that an increase or a decrease in redundancy is appropriate, respectively. So long as the badness value remains between these two thresholds, the communications parameters are left undisturbed from states 316 and 318, upon which the hub may proceed to the next end-device 306.

If, after accumulation 316, the badness exceeds the R+ threshold, the machine proceeds to consider 320 whether an adjustment in redundancy is permitted. If, for example, all the available redundancy has been applied to communications with an end-device, there would be no further action to take. If a scheme such as that shown in FIG. 12 were used and sub-channel F was already specified with a maximal spreading factor of 12, there would be no possible further action to take. In another example, it may be that the servicing time in the registered end-devices approaches a predefined limit, and requiring further time to apply additional redundancy would cause the hub to become unacceptably unresponsive. This would be particularly true for a set of high-priority end devices that must be serviced frequently; where the total time in servicing all registered devices exceeds some percentage of the available time, low-priority devices might be disallowed the use of redundancy beyond a specified limit.

If, after decay 316, the badness becomes lower than the R− threshold, the machine proceeds to consider whether to move to lesser redundancy. This would not be allowed where minimal redundancy was already being applied, such as an end-device using a sub-channel A with a minimal spreading factor of 6 where the scheme of FIG. 12 was used. The disallowance of the use of lesser redundancy might also be appropriate where an end-device bounces between two levels of redundancy too frequently; it may be more conservative of resources simply to leave an end-device using a higher-redundancy setting, especially ones that need infrequent communication or having low priority.

If an adjustment to redundancy is warranted, a new packet is queued either increasing 324 or decreasing 326 the redundancy. The packet is a directive to the current end-device to change its communication settings; in one example, the commanded end-device changes those settings immediately and uses the new settings to acknowledge the directive packet, which would all happen during state 312 in the next passage through the machine. Failover methods should be designed to recover from situations where a directive is not received or acknowledged, regardless of the method used. In one example, an end-device receiving a command to change communications parameters sends an acknowledgment several times to improve the chances that the hub receives at least one of them, all within a fail-safe period. In another example, both a hub and an end-device having lost contact for a predetermined period of time revert to a fail-safe set of communication parameters with the maximum redundancy available, providing a maximal assurance that contact will be restored. In a related example, the fail-safe set of communications parameters are those of a default initialization channel.

In the state machine of FIG. 14, a period of end-device turning ends when redundancy is increased, that is that the flag indicating tuning is turned off 328, such as in a device object as shown in FIG. 13, and ordinary adjustments to redundancy are then made. This operation is particularly helpful where a newly-added end-device is initialized in a high state of redundancy, backing into a redundancy level optimal for the present conditions where the badness value will stay between the R+ and R− thresholds. Following a change to the level of redundancy in use, the badness value may be reset 330 to a value between the R+ and R− values, which may be midway to allow for a minimum number of communication events to be sampled. Alternatively, the badness value may be set to just below the R+ threshold where redundancy was increased, or just above the R− threshold where redundancy was decreased, avoiding unnecessary cycling between two levels of redundancy.

A state machine such as the one of FIG. 14 may rely on a correlation between the presence of common interference on two channels of higher and lower redundancy sharing the same frequency or DSS frequencies. In an alternate method, channels having different redundancy may also differ in the frequencies used, particularly in the packet preamble. Where that is employed, if it is noticed that an end-device frequently "bounces" between two channels, further steps can be taken such as a reduction in the rate of badness decay or a lowering of the R− threshold.

The setting of threshold, accumulation and decay values is something that should be carefully set. FIG. 15 is an exemplary graph of extreme encounters with interference and clearance of interference, which assists in the understanding of the proper setting of values. Shown in the graph is an exemplary badness value through time in a first stage of accumulation followed a longer period of decay, modified through states such as 316 and 318 shown in FIG. 14. In the graph, each step represents one procession through state 312 where the sending of a packet is attempted. A badness value and others could be represented in floating point and changes thereto could follow a logarithmic curve, but recognizing that using an integer value is more fitting for a microcontroller or a logic environment, the discussion here will speak of integer settings and simple linear movement.

There are two settings illustrated in the graph, which are a step value used for accumulation "A", and a step value used for decay "D". Ordinarily D will be set to be much less than A, so that the reaction time in the presence of interference is fast, and movement toward a less redundant channel is slow, providing a filtering effect. In this way packet retries can be minimized, even though movement to a potentially problematic state with less redundancy is available. In the example, A is set to be four times D (as shown by the dashed line); it may be desired to increase that ratio so that R− movement doesn't happen before interference is allowed to clear. In the example, the threshold R+ is set to four times the A accumulation value, which provides for more than four successive retry attempts to trigger a change to a channel with higher redundancy. In ordinary operation, the badness value would float downward where the ratio of successful communication exceeded 4:1, and upward toward a switch to an R+ channel otherwise. A threshold R− can be set if desired: here that value is merely set at 0.

The settings used may also be specific to a type of end-device or application. For example, in a crowded environment it is preferable to minimize occupation on a channel, and for devices that will tolerate multiple retry attempts and long latency, a large number of retries on a channel with low redundancy is acceptable. For such, smaller values of A and larger R+ thresholds may be more suitable. Other devices have a low tolerance for packet transmission retries. For these, smaller values of R+ and higher ratios between accumulation and decay values are more appropriate. It would not be unusual to undertake experimentation in these settings to reach optimality.

Also for the state machine of FIG. 14 that uses a tuning up stage, the rate of dewy of the badness value can be accelerated to arrive at a reasonably optimal redundancy more quickly. Preferably, that is done by setting the initial value of D higher so that an end-device progresses through high levels of redundancy, and when tuning is ended such as by state 328, D can be set to a value for normal operation.

In order to properly apply countermeasures and redundancy with minimal impact, it is necessary to accurately assess the condition of a communications channel. There are sometimes means of gathering information provided with a transceiver circuit to do so, for example the reading of a value on an automatic gain control amplifier or a signal-to-noise (SNR) meter. The Semtech 127x transceivers have a value that can be read that gives an estimate of the SNR of the last packet received, another value for signal strength, and a flag that detects activity on a channel. Although these can be used under good conditions to detect collisions and overall signal strength to some extent, they do not work under all circumstances, do not provide values directly correlatable to errors and it is not preferred to rely solely upon these values in the determination of a proper redundancy setting. The use of a running badness value as described above provides a metric directly related to the channel condition, which metric can be used alone or in combination with other metrics, as desired.

As Asynchronous Devices and Anti-Interference Countermeasures

The servicing provided by a hub to end-devices operating in synchronous mode introduces a potentially long delay between subsequent communication events, caused by the need to sequence service through a number of end-devices, exacerbated where that number is large. For some end-device types, a delay between an event causing a need for communication with a hub and that communication is not tolerable. For example, where an end device implements a user input, such as a lighting control for a warehouse, a delay between a change in that input and the aspect controlled may cause a perception that a system is broken or non-responsive. For these kinds of end-devices, an asynchronous mode of communication as described above may be more suitable, allowing for an end-device to spontaneously send packets as a need arises.

At this point in the discussion, it is helpful to introduce an exemplary protocol useful for communication between a hub and end-devices in asynchronous mode. Now turning to FIG. 17, a sequence of packets is depicted proceeding down the page, with communications initiated by a particular end-device aligned to the left and ones by the hub to the right. This end-device is a keypad communicating wirelessly a sequence of keypresses to the hub, and it is to be understood that this protocol would be suitable for other types of user entry devices or devices suited for asynchronous communication with a hub. Packets would ordinarily include a preamble and an address; the portions shown in FIG. 17 correspond to the payload as shown in FIG. 4.

Beginning at the top, this keypad end-device has been assigned an operational communications channel and is properly configured. A person has entered the code "8-6-7-5-3-0-9#" on the pad, and the first packet 401 is transmission of that code to the hub. In this protocol, packets are organized into bytes as follows. The first byte NB is the number of bytes following, excepting the checksum CK at the end, which can be used by the receiver to determine the end of the packet and to check for corruption of the contents. The second byte NR is set to the value of a counter counting the number of retries needed before the current packet has been acknowledged by the hub, as will be shortly explained. The third byte EN contains a serial number of the present packet, which increments with successive new packets. The fourth byte PT contains a value identifying the type of the packet, which is followed by any data associated with that type.

The exemplary protocol requires the hub to acknowledge a packet received from an end-device within a specified time period. Where an end-device does not receive such an acknowledgment, it may transmit a packet as a retry. Here, no acknowledgment is received for packet 401, and correspondingly the end-device retries with a successive packet 402 containing the same serial number ER, packet type PT and data. Packet 402 is the first retry packet, and the NR value is set to 1 to indicate the content of this packet has been sent one time.

Packet 403 is sent by the hub to the end-device, containing one byte where PT=00, which is sufficient to provide acknowledgment. In the exemplary protocol, packets sent from the hub do not contain an NR field, although that could be included where helpful. Any packet sent by the hub in response to a packet received from an end-device includes an identical serial number EN, so that the end-device can confirm that the correct packet was received and processed by the hub. Now it is possible that the hub received packet 401, but the end-device did not receive a corresponding acknowledgement due to interference or other reasons, and the hub can detect duplicated packets from an end-device by checking that the EN field has been incremented from the last received one. Where a duplicated packet is detected, the hub may provide the same packet in response, and the error condition will clear once that response is received by the end-device or a reset occurs on the channel.

Packet 404 is a status at heartbeat packet that may optionally be transmitted by an end-device, indicating to a hub that the end-device is operating in a particular state, and testing the quality of the communications channel. Where that quality is good, a hub will receive such a packet 404 and transmit back and acknowledgment packet 405, noting the number of retries NR needed.

Following the transmission of packet 405, an interval passes during which there is more activity. Eventually, the end-device transmits packet 406, which is another status packet. This one, however follows two earlier packets containing the same information, with the exception of the NR value. The end-device did not receive an acknowledgment to those two previously transmitted packets, and correspondingly the NR value is 2, as packet 406 is a second retry attempt.

Continuing in the sequence of FIG. 17, the hub receives packet 406 and prepares a response. The hub, whether using a criterium described herein or otherwise, determines that this end-device should move to a different communications channel. To effect that change, the hub sends a packet 407 to the end-device containing a command to change its operational channel. In the example, a channel is defined as a single byte, the hub and the end-device both having stored thereon a table or other information containing communications parameters sufficient to reprogram a transceiver for normal operation, such as the tables described in relation to FIGS. 7 and 12. In another example, the communications protocol could contain a command to change the communications parameters directly, with the packet containing those parameters rather than a channel number. Regardless of the protocol or command used, the effect is the transiting of a communication with sufficient content to allow for both the hub and the end-device to synchronize subsequent communication using a common set of parameters.

It is preferred that the timeout period for acknowledgment be sufficiently long such that the hub is likely to complete the evaluation of the criterion of whether to command a change in channel, so the end-device does not initiate a retry. As in the exemplary protocol the hub can direct a channel change in any responsive packet, a shorter timeout period can be used, although some communications bandwidth will be consumed in retry packets. It is also preferred that a hub notice identical packets received on retry, such as by an identical serial number EN, which may be discarded. In this way the hub can discriminate between retries due to communication failures, and retries due to delays in processing, making the most effective adaptions to communications. In an alternative, where a packet is noted to be a retry (such as having a non-zero value for NR), the hub may block interrupts for the time needed to consider whether a change in channel is to be commanded and to queue up a command packet for transmission; in this way the chance of blowing an acknowledgment period is minimized. In another alternative, a hub could continue to process multiple interrupts, and send an "I'm busy at the moment, please transmit again" packet to an end-device waiting for an acknowledgment where more than a set number of packets from end-devices are in process. That end-device would then wait for a period of time set to allow the condition to clear, which might be something on the order of two or more times the acknowledgment period.

The result of the transmission of a packet 407 containing a command to change the communications channel will result in two outcomes: either the end-device received the packet or it did not. If the end-device receives the packet, it sends a new packet 408 in acknowledgment of that change containing the channel number, which serves as a confirmation to the hub of that receipt. The hub may reply with a new acknowledgment 409. If an end-device does not receive the change-channel packet 407, the hub will not receive a packet 408 in acknowledgment, and the hub may send a duplicate of packet 407 upon receiving the next packet in retry of packet 406. The majority of the time, both the previous channel and the succeeding channel will be monitored, so regardless of whether an end-device receives a channel-changing command, communications are unlikely to be interrupted. Nevertheless, the end-device may return to a default channel, such as a default initialization channel, after some number or retries, restoring communication. Following a channel change acknowledgment packet 408 and an acknowledgment period, both the hub and the changing end-device should have effected the channel change, and a record such as that shown in FIG. 13 may be updated for that end-device as appropriate.

The assignment of an operational channel to an asynchronously-communicating end-device can be more complicated than that of their synchronous counterparts. A hub communicating synchronously may use a single transceiver for communication, reconfiguring it as it is switched from device to device. A hub communicating asynchronously must devote a single transceiver to each channel used, if the hub is to be available for packet receipt all of the time. Unavailability of a hub to listen for an asynchronous packet from an end-device can yield additional retries of packet transmissions, perceptible delays and potentially resets to a default channel or state. It is therefore preferred that there be a 1:1 relationship between channels and transceivers used for receipt of packets in asynchronous communication, configuring the transceivers infrequently and making them fully available on their respective channels.

Where it is desired to include a hub servicing end-devices asynchronously, an arrangement such as that shown in FIG. 9 and described above can be used. In that arrangement having n transceivers 32b through 32n are configured in receive-only mode and transceiver 34a can serve to both transmit and receive, even though all may be implemented using the same transceiver part or integrated circuit. Thus, for the purposes of communicating with end-devices asynchronously, the arrangement of FIG. 9 can be organized into effectively n-1 receivers and one transceiver. In that arrangement, it may be convenient for transceiver 32a to be used for all additional synchronous end-device communication, when that is needed. In that arrangement, where n-1 or fewer end-devices are being serviced asynchronously, it is a simple matter to assign each device to a transceiver (in receive mode), provided that orthogonal open channels are available to which each transceiver may be configured. That may, however, be wasteful of resources as most end-devices and their corresponding transceivers are likely to stand idle most of the time. Given that the inclusion of additional transceivers into a hub increases its complexity and expense, it may be preferred to use an arrangement permitting more than one end-device to be serviced by single transceivers, recognizing that in doing so there will be a risk of packet collisions.

Depicted in FIG. 16 is such an arrangement, represented as structures in the memory of a hub. In this organization, a number of levels of redundancy are tracked in a table 280, allowing for a lookup of receivers that are operating at each available level. As shown, each level of redundancy is implemented by a unique spreading factor, 6 through 12. It is to be recognized that other implementations of redundancy can be implemented using additional or other mechanisms, for example forward error correction; the implementation shown is chosen for its simplicity in teaching here, and thus other communications parameters may be included within such a table as desired. For each entry in table 280, a list of receivers included that are assigned to operate using the communication parameters corresponding to the particular level of redundancy. As shown, a hub includes six transceivers $R_N$, $R_1$ operating at the lowest level of redundancy at SF=6, $R_2$ and $R_3$ both operating at SF=8, $R_4$ at SF=9, and $R_5$ at the highest level of redundancy at SF=12. Using the hub configuration of FIG. 9, $R_O$ operates as a transceiver, is reserved for synchronous communication and outbound transmissions generally, and does not appear in the table. Looking back to the communications shown in FIG. 17, all packets originating at the hub would use $R_O$ as a transmitter in that configuration.

As shown in table 280, not all levels of redundancy are represented by the system; redundancy levels 1,4 and 5 have no receiver assigned. Additionally, redundancy level 2 is assigned two transceivers; where two or more transceivers share a level of redundancy, they will each occupy an orthogonal channel allowing for the reception of packets collision-free and simultaneously. Table 280 can be changed over time as changes are made in the system and the environment, adjusting for the addition or withdrawal of paired devices, or as interference conditions change. Even so, a hub can operate using a fixed table or relationship between levels of redundancy and receivers in use.

For each receiver operated to listen in asynchronous mode in this exemplary system, a record is maintained 281 containing several current items of information. Each receiver is configured with certain parameters, here for receiver $R_1$ a frequency sequence 31, a spreading factor of 6, and a bit rate of 9600, which parameters are stored in the record. Where a procedure for redundancy adaption as disclosed below is used, a metric corresponding to the frequency of collisions and utilization of the receiver are also stored in the record 281. Finally, the exemplary receiver record includes a list of device records 282a-n with items discussed above in connection with FIG. 13 and synchronous communication.

Figure 18:
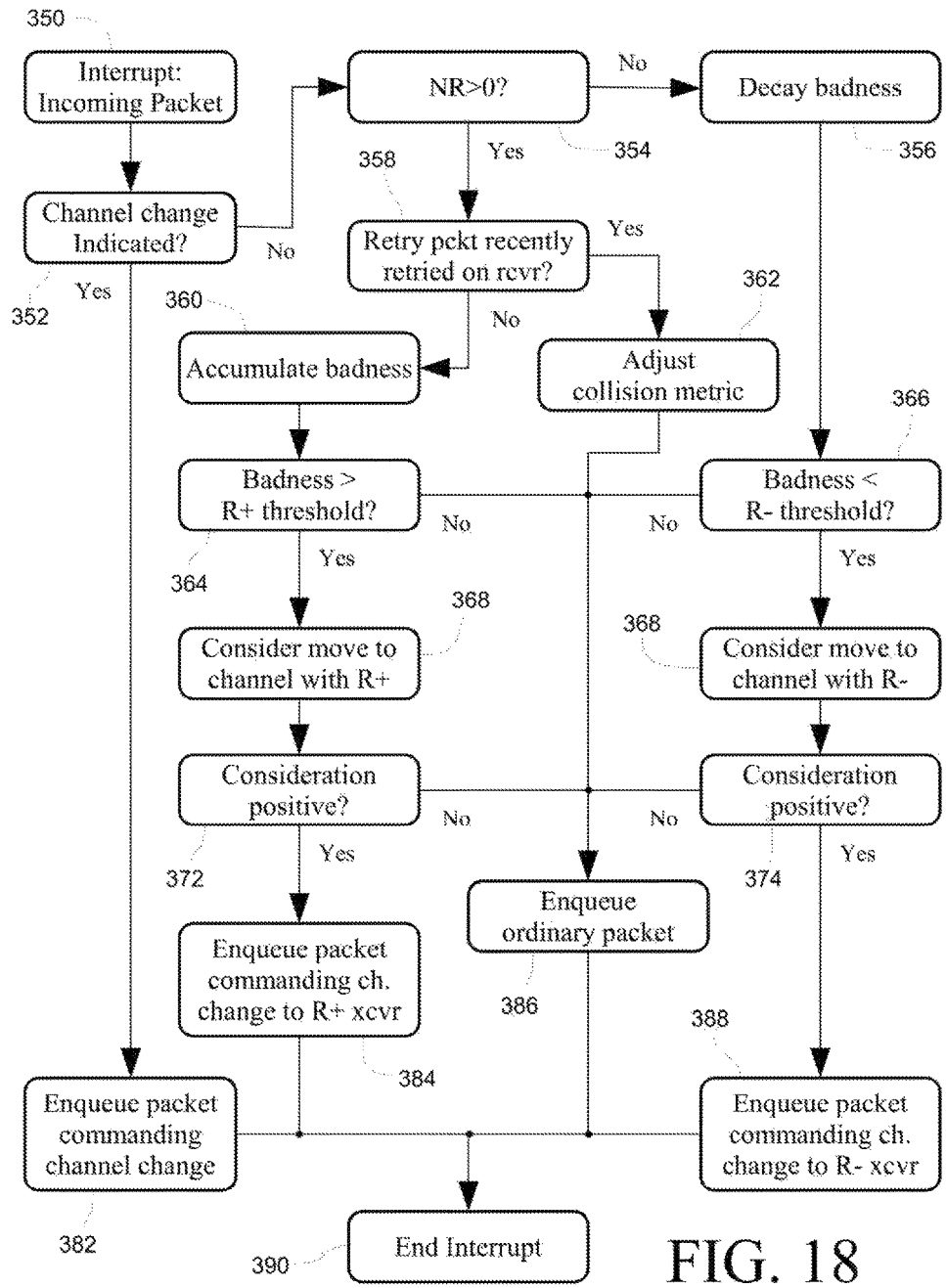
FIG. 18 depicts a state machine for interacting with individual end-devices in an interrupt-driven asynchronous mode employing communication through a packet queue, detection of errors due to collisions and other problems beyond a redundancy solution, a device-specific quality measurement of a present operational channel, and adaption in varying amounts of redundancy spread over a set of receivers.

Adaption to redundancy in a system communicating with more end-devices than available receivers can be conducted using a state sequence as shown in FIG. 18. The sequence is entered is 350 with an interrupt caused by the successful reception of a packet from an end-device, such as might occur through a hub configuration as shown and described for FIG. 9. It is preferable that traversal of this state sequence always occur within a timeout period for production of an acknowledgment packet back to the end-device, so the hub is faster to react to present conditions, although that is not necessary. The first tasks the hub should do while in state 350 identify the receiver holding the packet in its buffer, download the packet, and identify the sourcing end-device, which identification may be to the creation of pointers to memory structures 281 and 282 of FIG. 16.

Upon receiving and processing an incoming packet and identification of an end-device, the hub can then 352 determine whether an indication of a channel change is present. This could happen, for example if the hub was in the process of reconfiguring a receiver to operate on a different channel, or if the hub had previously determined that operation of that end-device should occur using a different receiver and its assigned channel. If a channel change has been indicated in some other way, there is no need to proceed through the adaption states, and the hub may simply enqueue 382 a packet containing a command to the indicated channel and proceed from there.

If there is not such a channel change indicated, the sequence considers 254 whether the latest packet is a retry of an earlier one, which in the packet format described in FIG. 17 is indicated by an NR value greater than zero. If not, then the latest packet came through the first time, and the badness value may be decayed 356, as explained above.

Where a retry on a packet was needed, a further determination is performed in step 358. The sequence considers two possibilities. First, that the cause of retry was due to some interference for which redundancy could improve communications with the end device, and second that the cause was due to something else. Causes for which redundancy is not effective include collisions due to two end-devices transmitting at the same time, and failures of a hub to timely acknowledge a packet from an end-device. As both of these do not provide information as to the reliability or quality of the communications link between the hub and the end-device, the badness value is retained as it is. Instead, the sequence adjusts a collision metric 362, and proceeds to fashion and enqueue an ordinary response 386. The collision metric could be any measure of packet collisions over time, useful to identify receivers that are overly crowded. In an exemplary method as shown, the determination is made upon the temporal proximity of retired packets, made under the assumption that two devices needing a packet retry likely suffered a collision. Where the badness of another end-device assigned to the same receiver was recently accumulated, that badness value could be reverted back to its previous value. In a related procedure, the badness adjustment may be skipped where an acknowledgment packet was not timely sent, which can be determined at the hub. The method used for determining to skip a badness adjustment may be varied or omitted entirely, to suit the particular application or circumstances of use.

Where a retry packet is determined to be likely due to interference which redundancy might solve, the badness value is accumulated 360 in much the same way as described in connection with FIG. 15. As the badness value is particular to the end-device transmitting a packet, the badness value that is adjusted is stored in a device-specific record such as 282. A comparison is then made 364 for an excessive badness value, and if the value remains below an R+ threshold an ordinary packet is fashioned and enqueued 386. Otherwise consideration is made 368 to determine whether moving the particular end-device to a channel with more redundancy is appropriate.

That consideration can take a number of factors into account. First, where there is no receiver operating on a channel with more redundancy, no movement can be made. For example, device communicating with in $R_5$ in FIG. 16 would already be on the channel with the highest redundancy available. Second, movement to another channel may be restricted where the receiver-to-be is highly utilized, e.g. where collisions are likely to occur. Third, then may be a manual setting overriding channel movement. The conditions applied to this consideration 368 will depend upon the particular circumstances of use, as may be determined by a person of ordinary skill in the art. Where this consideration yields a positive indication that a move to a more redundant channel is indicated, a new receiver will be selected. For example, in FIG. 16 an end-device assigned to $R_1$ could be moved to either of $R_2$ or $R_3$; the final selection could be made on the basis of which receiver had the lesser utilization at the time. That consideration is then evaluated 372, and if positive a packet is enqueued 384 commanding the end-device to match the communications parameters of the selected receiver.

Where the packet was not retried, badness may be decayed 356 and an evaluation made to determine whether it is sufficiently low to warrant further action 366. If yes, consideration 370 is made to the appropriateness of a change to a less redundant channel. That may be inappropriate where there is no receiver operating on a channel with less redundancy, where utilization of receivers yields a contraindication of the change, where an end-device is manually set to a level of redundancy, or other factors as may be determined by a person of ordinary skill in the art. Where this consideration yields a positive indication that a move to a less redundant channel is indicated, a new receiver will be identified. That consideration is then evaluated 374, and it positive a packet is enqueued 388 commanding the end-device to match the communications parameters of the identified receiver.

The end of the sequence results in an enqueued response packet to the device supplying the incoming one, and the processing caused by the interrupt ends 390. The sequence can block until the packet to response is sent, but that isn't necessary. Rather, the hub can simply use the common transceiver to send the enqueued packet through ordinary operation, recognizing that it may be preferred to prioritize transmission of packets destined for asynchronous-mode end-devices to avoid a timeout and a duplicated iteration through the state table. Also note that where a command to change channel was issued, the badness value for a device should be reset as described above for adaption synchronous mode.

In an alternate method, if in state 372 suitable receiver is not available operating on a higher redundancy, or overutilization or another reason, the hub selects a channel for synchronous mode with sufficient redundancy and issues a command to the end-device under consideration both to use that channel and to proceed in synchronous mode. In a further method, during the consideration 368 if other receivers are unavailable due to overutilization, a hub may select an asynchronously-communicating end-device of lower priority to relocate to another receiver with sufficient capacity and redundancy, queue a command to the selected device to change to the channel of that receiver, and issue a command to the first-end-device under consideration to occupy the newly available utilization. In a further and similar method, during the consideration 368 if other receivers are unavailable due to overutilization, a hub may select an asynchronously-communicating end-device of lower priority and change it to synchronous communication, allowing the first end-device to occupy the newly available utilization.

Measures of utilization can be done in numerous ways. A first way simply uses the number of end-devices assigned to a receiver. A similar way also considers redundancy, allowing fewer devices to use a receiver operating at a greater redundancy. For example in the scheme shown in FIG. 16, $R_2$ would be permitted to have twice as many end-devices assigned as $R_4$, as packets transmitted to $R_4$ would take about twice as long in transit. In a third way, a calculation is made for each packet received how much time on air is taken, accumulated for particular receivers over a given time. Overutilization is determined by a cumulative time on air value that exceeds a certain amount or percentage of total time. A fourth way uses the collision metric discussed for state 362, with the metric being incremented on each suspected collision. In that scheme, a receiver having a collision metric beyond a certain value would be disallowed the assignment of further end-devices. Other ways of calculating overutilization can be crafted using combinations of these, or use other metrics or calculations entirely as will be understood by one of ordinary skill.

As to initialization of an end-device to a working redundancy level, in a first exemplary method the end-device is first initialized to communicate in synchronous mode and allowed to tune up. If the procedure described for FIG. 14 were used, interaction between the hub and the end-device would continue in synchronous mode until tuning had taken place 328, upon which the end-device would be directed to communicate in asynchronous mode on a channel used by a receiver using the same or similar redundancy. Although this method carries the disadvantage that asynchronous communication isn't available for the tuning period, perhaps some number of seconds or minutes, it is likely to arrive at known optimal level of redundancy even in a congested network. In a second exemplary method, the end-device would be initialized to communicate asynchronously using a receiver with the maximum redundancy available, and to gradually use the operation of adaptation in asynchronous mode, such as described for FIG. 18. Although this method is simpler, difficulties may arise where receivers are highly utilized. In a third method, the signal-to-noise ratio can be measured from a newly-added end-device, which may be initially assigned to a receiver communicating with other end-devices of a similar ratio, or on the basis of a pre-determined calculation. Other methods of redundancy initialization can be used, as will be understood by a person of ordinary skill.

Now although certain systems, products, components, functions and methods have been described above in detail for specific applications, one of ordinary skill in the art will recognize that these functions and methods are adaptable to other systems and products. Likewise, although the described functions have been described through the use of block and state diagrams, flowcharts, and software and hardware descriptions, one of ordinary skill in the art will recognize that most of the functions described herein may be implemented in software or hardware. State machines described herein may likewise be implemented completely in logic, as software executable on a general-purpose or embedded processor, or as a mixture of both. Some of the descriptions herein refer to specific protocols and modulation types, which are only exemplary; other protocols and types may be substituted as desired in accordance with the inventive concepts. More specifically, it is to be understood that although the accompanying description makes reference to the LoRa and LoRaWAN protocols and designs, the inventions described herein may be used in other kinds of intermediate-range networks, RF bands and using other equipment. The exact configurations described herein need not be adhered to, but rather the diagrams and architectures described herein may be varied according to the skill of one of ordinary skill in the art. Therefore, the inventions disclosed herein are to be fully embraced within the scope as defined in the claims. It is furthermore understood that the summary description and the abstract are provided merely for indexing and searching purposes, and do not limit the inventions presented herein in any way.

What is claimed:

1. A system of devices in communication at intermediate ranges, the devices utilizing a set of discrete radio-frequency channels, the channels optionally including a set of digital spread-spectrum frequencies, said system comprising:
   a hub comprising a set of radio-frequency receivers functional for wireless communication over the set of discrete radio-frequency channels, said hub containing an electronic circuit implementing a state machine immutable to power-transient events, said hub further containing a memory wherein may be stored an end-device registry; and
   a plurality of end-devices each comprising a radio-frequency transceiver functional for wireless communication over the set of discrete radio-frequency channels, each of said end-devices further containing an electronic circuit implementing a state machine immutable to power-transient events, each of said end-devices having stored thereon a unique identifier, each of said end-devices further implementing a control or a sensing function, each of the plurality of said end-devices being physically located within communicative locality of said hub;
   wherein the state machine of said hub is configured to sequence through a set of states to implement the functions of:
   (a) initializing said hub electronic circuit and said radio-frequency receivers into a power-on state,
   (b) accessing a list of registered end-devices,
   (c) maintaining a memory record for each of said receivers of said hub, that record having contents that include a set of communications parameters,
   (d) maintaining a memory record for each registered end-device configured to communicate with said hub in an asynchronous mode,
   (e) maintaining a memory record of the assignment between one of said receivers and one of said registered end-devices,
   (f) receiving on each of said receivers incoming packets from said end-devices,
   (g) in the course of said receiving, identifying the presence and absence of communication failure events,
   (h) in the course of said receiving and following reception of a packet from an end-device without an identified communication failure event, adjusting a metric for that end-device in a predetermined decay to indicate better communication quality,
   (i) in the course of said receiving and following reception of a packet from an end-device with an identified communication failure event, adjusting a metric for that end-device in a predetermined accumulation to indicate worse communication quality, (j) following an adjustment to a communication quality metric for an end-device to indicate better communication quality, testing that metric for having subsided below a predetermined R− threshold,
(k) following the testing of a communication quality metric for an end-device against a predetermined R− value, considering for that end-device a move to a channel having a reduction in communication redundancy,
(l) following the consideration for a move to a channel having a reduction in communication redundancy for an end-device and upon that consideration yielding a positive result, identifying a receiver open to receive an assignment of that end-device using a channel having a reduction in communication redundancy,
(m) following an adjustment to a communication quality metric for an end-device to indicate worse communication quality, testing that metric for having exceeded a predetermined R+ value,
(n) following the testing of a communication quality metric for an end-device against a predetermined R+ value, considering for that end-device a move to a channel having an increase in communication redundancy,
(o) following the consideration for a move to a channel having an increase in communication redundancy for an end-device and upon that consideration yielding a positive result, identifying a receiver open to receive an assignment of that end-device using a channel having an increase in communication redundancy, and
(p) following the identification of a receiver to receive an assignment of an end-device, enqueuing a packet commanding that end-device to reconfigure communications parameters for the identified receiver, and updating the memory records of both that end-device and the identified receiver; and
wherein the state machine of each of said end-devices is configured to sequence through a set of states to implement the functions of:
(q) sending packets to the hub on one of the channels in asynchronous mode,
(r) receiving response packets from said hub containing a command to change the channel for the sending of future packets, and
(s) upon receipt of a command to change channel, reconfiguring said transceiver to transmit using the parameters of that channel.

2. The system recited in claim 1, wherein said hub is configured to sequence through a series of states from the reception of an asynchronous-mode packet on one of said receivers to the enqueueing of a packet commanding an end-device to reconfigure communications parameters occurs within a predetermined timeout period under normal operating conditions.

3. The system recited in claim 1, wherein said hub is configured to block further interrupt events while sequencing through possible series of states from the reception of an asynchronous-mode packet on one of said receivers to the enqueueing of a packet commanding an end-device to reconfigure communications parameters.

4. The system recited in claim 1, wherein said hub is configured to initially communicate with said end-devices in a synchronous mode.

5. The system recited in claim 1, wherein each of said end-devices is configured to initially operate on a default initialization channel.

6. The system recited in claim 1, wherein said hub further comprises a transceiver separate from said receivers, and further wherein said hub is configured to issue acknowledgment packets using said transceiver.

7. The system recited in claim 6, wherein said hub is further configured to communicate with registered end-devices in synchronous mode using said transceiver.

8. The system recited in claim 6, wherein said hub is further configured to communicate acknowledgment to received packets from registered end-devices operating in asynchronous mode using said transceiver.

9. The system recited in claim 1, wherein both of said hub and said plurality of end-devices utilize a channel scheme where increases in redundancy are through increases in spreading factors.

10. The system as recited in claim 1, wherein said hub and each of said end-devices includes a table relating a channel identifier to a set of communication parameters, and further wherein a command to change a channel includes a channel identifier without communications parameters.

11. The system as recited in claim 1, wherein a command to change a channel includes communication parameters without a channel identifier.

12. A hub for communicating with end-devices at intermediate ranges, said hub and the end-devices utilizing a set of discrete radio-frequency channels, the channels optionally including a set of digital spread-spectrum frequencies, the end-devices implementing a control or a sensing function, said hub comprising:
a set of radio-frequency receivers functional for wireless communication over the set of discrete radio-frequency channels;
a memory wherein may be stored an end-device registry; and
an electronic circuit implementing a state machine immutable to power-transient events, said state machine being configured to sequence through a set of states to implement the functions of:
(a) initializing said hub electronic circuit and said radio-frequency receivers into a power-on state,
(b) accessing a list of registered end-devices,
(c) maintaining a memory record for each of said receivers of said hub, that record having contents that include a set of communications parameters,
(d) maintaining a memory record for each registered end-device configured to communicate with said hub in an asynchronous mode,
(e) maintaining a memory record of assignments between one of said receivers and one registered end-device,
(f) receiving on each of said receivers incoming packets from end-devices,
(g) in the course of said receiving, identifying the presence and absence of communication failure events,
(h) in the course of said receiving and following reception of a packet from an end-device without an identified communication failure event, adjusting a metric for that end-device in a predetermined decay to indicate better communication quality,
(i) in the course of said receiving and following reception of a packet from an end-device with an identified communication failure event, adjusting a metric for that end-device in a predetermined accumulation to indicate worse communication quality,
(j) following an adjustment to a communication quality metric for an end-device to indicate better communication quality, testing that metric for having subsided below a predetermined R− threshold,
(k) following the testing of a communication quality metric for an end-device against a predetermined R− value, considering for that end-device a move to a channel having a reduction in communication redundancy,
(l) following the consideration for a move to a channel having a reduction in communication redundancy for an end-device and upon that consideration yielding a positive result, identifying a receiver open to receive an assignment of that end-device using a channel having a reduction in communication redundancy,
(m) following an adjustment to a communication quality metric for an end-device to indicate worse communication quality, testing that metric for having exceeded a predetermined R+ value,
(n) following the testing of a communication quality metric for an end-device against a predetermined R+ value, considering for that end-device a move to a channel having an increase in communication redundancy,
(o) following the consideration for a move to a channel having an increase in communication redundancy for an end-device and upon that consideration yielding a positive result, identifying a receiver open to receive an assignment of that end-device using a channel having an increase in communication redundancy, and
(p) following the identification of a receiver to receive an assignment of an end-device, enqueuing a packet commanding that end-device to reconfigure communications parameters for the identified receiver, and updating the memory records of both that end-device and the identified receiver.

13. The hub recited in claim 12, wherein said hub is configured to sequence through a series of states from the reception of an asynchronous-mode packet on one of said receivers to the enqueueing of a packet commanding an end-device to reconfigure communications parameters occurs within a predetermined timeout period under normal operating conditions.

14. The hub recited in claim 12, wherein said hub is configured to block further interrupt events while sequencing through possible series of states from the reception of an asynchronous-mode packet on one of said receivers to the enqueueing of a packet commanding an end-device to reconfigure communications parameters.

15. The hub recited in claim 12, wherein said hub is configured to initially communicate with said end-devices in a synchronous mode.

16. The hub recited in claim 12, wherein said hub further comprises a transceiver separate from said receivers, and further wherein said hub is configured to issue acknowledgment packets using said transceiver.

17. The hub recited in claim 16, wherein said hub is further configured to communicate with registered end-devices in synchronous mode using said transceiver.

18. The hub recited in claim 16, wherein said hub is further configured to communicate acknowledgment to received packets from registered end-devices operating in asynchronous mode using said transceiver.

19. The hub recited in claim 12, wherein both of said hub and said plurality of end-devices utilize a channel scheme where increases in redundancy are through increases in spreading factors.

20. The system of claim 1, wherein the hub and or the plurality of end-devices comprise one or more antennas each comprising a printed circuit board having a planar side comprising a plurality of electrically conductive planar v-shaped antenna trace segments, each v-shaped antenna trace segment comprising an open end formed by non-equidistant, non-parallel sides and a closed end formed by an intersection of the non-equidistant, non-parallel sides.

* * * * *